US010044045B2

(12) United States Patent
Monden et al.

(10) Patent No.: US 10,044,045 B2
(45) Date of Patent: Aug. 7, 2018

(54) PROCESS FOR PRODUCING A FUEL CELL ELECTRODE CATALYST, FUEL CELL ELECTRODE CATALYST AND USE THEREOF

(75) Inventors: Ryuji Monden, Tokyo (JP); Takuya Imai, Tokyo (JP); Yuji Ito, Tokyo (JP); Kunchan Lee, Tokyo (JP); Takashi Sato, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 74 days.

(21) Appl. No.: 14/236,814

(22) PCT Filed: Apr. 13, 2012

(86) PCT No.: PCT/JP2012/060176
§ 371 (c)(1),
(2), (4) Date: Feb. 3, 2014

(87) PCT Pub. No.: WO2013/021688
PCT Pub. Date: Feb. 14, 2013

(65) Prior Publication Data
US 2014/0170528 A1 Jun. 19, 2014

(30) Foreign Application Priority Data
Aug. 9, 2011 (JP) .................. 2011-174054

(51) Int. Cl.
*B01J 31/00* (2006.01)
*H01M 4/90* (2006.01)
(Continued)

(52) U.S. Cl.
CPC ....... *H01M 4/9075* (2013.01); *B01J 31/0202* (2013.01); *B01J 31/0232* (2013.01);
(Continued)

(58) Field of Classification Search
CPC .... H01M 4/88; H01M 4/9083; H01M 4/9075; H01M 4/86; H01M 8/1002;
(Continued)

(56) References Cited

U.S. PATENT DOCUMENTS

2003/0121543 A1  7/2003  Gratzel et al.
2004/0096728 A1  5/2004  Campbell
(Continued)

FOREIGN PATENT DOCUMENTS

CN  103299464 A  9/2013
EP  1175938 A1  1/2002
(Continued)

OTHER PUBLICATIONS

Communication dated Feb. 5, 2015 from the European Patent Office in counterpart application No. 12822221.3.
(Continued)

*Primary Examiner* — Stephen J Yanchuk
(74) *Attorney, Agent, or Firm* — Sughrue Mion, PLLC

(57) ABSTRACT

Provided is a process for producing a fuel cell electrode catalyst with high catalytic activity that is alternative to a noble metal catalyst, through a heat treatment at a relatively low temperature. A process for producing a fuel cell electrode catalyst includes a step (I) of obtaining a catalyst precursor, including a step (Ia) of mixing at least a metal compound (1), a nitrogen-containing organic compound (2), and a fluorine-containing compound (3), and a step (II) of heat-treating the catalyst precursor at a temperature of 500 to 1300° C. to obtain an electrode catalyst, a portion or the entirety of the metal compound (1) being a compound containing an atom of a metal element M1 selected from the group consisting of iron, cobalt, chromium, nickel, copper, zinc, titanium, niobium and zirconium, and at least one of the compounds (1), (2) and (3) containing an oxygen atom.

21 Claims, 10 Drawing Sheets

(Catalyst 1)

(51) Int. Cl.
- *H01M 4/88* (2006.01)
- *B01J 31/02* (2006.01)
- *B01J 31/22* (2006.01)
- *H01M 4/86* (2006.01)
- *B01J 31/18* (2006.01)
- *H01M 8/1007* (2016.01)

(52) U.S. Cl.
CPC ....... *B01J 31/1815* (2013.01); *B01J 31/2217* (2013.01); *B01J 31/2234* (2013.01); *H01M 4/86* (2013.01); *H01M 4/88* (2013.01); *H01M 4/9083* (2013.01); *H01M 8/1007* (2016.02); *B01J 31/2239* (2013.01); *B01J 2231/20* (2013.01); *B01J 2531/16* (2013.01); *B01J 2531/26* (2013.01); *B01J 2531/46* (2013.01); *B01J 2531/48* (2013.01); *B01J 2531/57* (2013.01); *B01J 2531/72* (2013.01); *B01J 2531/821* (2013.01); *B01J 2531/842* (2013.01); *B01J 2531/845* (2013.01)

(58) Field of Classification Search
CPC ............... B01J 31/0202; B01J 31/0232; B01J 31/2217; B01J 31/2234; B01J 31/1815; B01J 31/2239; B01J 2531/845; B01J 2531/2239; B01J 2531/16; B01J 2531/26; B01J 2531/46; B01J 2531/48; B01J 2531/57; B01J 2531/842; B01J 2531/20; B01J 2531/72; B01J 2531/821; Y02E 60/522

See application file for complete search history.

(56) References Cited

U.S. PATENT DOCUMENTS

| | | |
|---|---|---|
| 2004/0234857 A1 | 11/2004 | Shiozaki et al. |
| 2005/0037255 A1 | 2/2005 | Ozaki et al. |
| 2005/0283035 A1* | 12/2005 | Ganesan ................ B01J 27/122 570/207 |
| 2008/0026282 A1 | 1/2008 | Tamura et al. |
| 2008/0187475 A1 | 8/2008 | Gordienko |
| 2009/0136810 A1 | 5/2009 | Ishida et al. |
| 2010/0086823 A1 | 4/2010 | Koshino et al. |
| 2010/0105909 A1* | 4/2010 | Matsunaga .......... B01J 31/1805 546/6 |
| 2010/0129698 A1 | 5/2010 | Okada et al. |
| 2010/0227249 A1* | 9/2010 | Kawamura .......... H01M 4/8605 429/483 |
| 2010/0227253 A1 | 9/2010 | Monden et al. |
| 2010/0255404 A1 | 10/2010 | Kurozumi et al. |
| 2011/0008709 A1 | 1/2011 | Shishikura et al. |
| 2011/0015058 A1 | 1/2011 | Maki |
| 2012/0148483 A1* | 6/2012 | Chen .................. H01M 4/9008 423/584 |
| 2012/0172210 A1 | 7/2012 | Ishida et al. |
| 2013/0130036 A1 | 5/2013 | Bettiol et al. |

FOREIGN PATENT DOCUMENTS

| | | |
|---|---|---|
| EP | 1447866 A1 | 8/2004 |
| EP | 1683762 A1 | 7/2006 |
| EP | 2136426 A1 | 12/2009 |
| JP | 2004-303664 A | 10/2004 |
| JP | 2005-019332 A | 1/2005 |
| JP | 2008-021638 A | 1/2008 |
| JP | 2008-258150 A | 10/2008 |
| JP | 2009-023887 A | 2/2009 |
| JP | 2009-255053 A | 11/2009 |
| WO | 2006/104123 A1 | 10/2006 |
| WO | 2007/072665 A1 | 6/2007 |
| WO | 2008/111570 A1 | 9/2008 |
| WO | 2009/028408 A1 | 3/2009 |
| WO | 2009/031383 A1 | 3/2009 |
| WO | 2009/107518 A1 | 9/2009 |
| WO | 2012017347 A1 | 2/2012 |

OTHER PUBLICATIONS

International Search Report dated Jun. 26, 2012 for International Application No. PCT/JP2012/060176.

Fengxiang Yin, et al.; "Improved Catalytic Performance of Nitrided Co—Ti and Fe—Ti Catalysts for Oxygen Reduction as Non-Noble Metal Cathodes in Acidic Media"; Electrochemistry Communications; vol. 12; Issue 9; Sep. 2010; pp. 1177-1179.

Song-Wang Yang et al.; "Simple and Effective Preparation of N-doped $TiO_2$ Nanocrystallites with Visible-light Activities"; Journal of Inorganic Materials (Chinese); vol. 20; No. 4; 2005; pp. 785-788.

\* cited by examiner (Catalyst 1)

(Catalyst 1)

(Catalyst 2)

(Catalyst 2)

(Catalyst 3)

(Catalyst 3)

(Catalyst 4)

(Catalyst 4)

(Catalyst 5)

(Catalyst 5)

(Catalyst 6)

(Catalyst 6)

(Catalyst 7)

(Catalyst 7)

(Catalyst 8)

(Catalyst 8)

(Catalyst 9)

(Catalyst 9)

(Catalyst 10)

(Catalyst 10)

(Catalyst c1)

(Catalyst c3)

(Catalyst c4)

(Catalyst c5)

(Catalsyt c6)

PROCESS FOR PRODUCING A FUEL CELL ELECTRODE CATALYST, FUEL CELL ELECTRODE CATALYST AND USE THEREOF

CROSS REFERENCE TO RELATED APPLICATIONS

This application is a National Stage of International Application No. PCT/JP2012/060176 filed Apr. 13, 2012, claiming priority based on Japanese Patent Application No. 2011-174054 filed Aug. 9, 2011, the contents of all of which are incorporated herein by reference in their entirety.

TECHNICAL FIELD

The present invention relates to a process for producing a fuel cell electrode catalyst; a process for producing a transition metal oxycarbonitride; and a fuel cell electrode catalyst; and uses thereof.

BACKGROUND ART

A polymer electrolyte fuel cell has a solid polymer electrolyte sandwiched between an anode and a cathode. A fuel is fed to the anode, and oxygen or air is fed to the cathode, whereby oxygen is reduced at the cathode to produce electricity. The fuel is primarily hydrogen, methanol or the like.

To increase the reaction rate in the fuel cell and enhance the energy conversion efficiency of the fuel cell, a layer containing a catalyst (hereinafter, also referred to as a "fuel cell catalyst layer") is conventionally provided on the surface of a cathode (an air electrode) or an anode (a fuel electrode) of the fuel cell.

As such a catalyst, noble metals are generally used. Of them, noble metals which are stable at high potential and have high catalytic activity, such as platinum or palladium, have been primarily used. However, since these noble metals are expensive and limited in resource amount, alternative catalysts have been desired.

Further, the noble metals used on the cathode surface are sometimes dissolved in an acidic atmosphere and are not suited in applications requiring long-term durability. Accordingly, it has been strongly demanded that catalysts are developed which are not corroded in an acidic atmosphere and have excellent durability and high oxygen reducing activity.

As a catalyst alternative to noble metals, those entirely free of noble metals, such as base metal carbides, base metal oxides, base metal oxycarbonitrides, chalcogen compounds and carbon catalysts, have been reported (for example, see Patent Literature 1 to Patent Literature 4). These materials are inexpensive and exist abundantly as compared with noble metal materials such as platinum.

However, catalysts containing base metal materials described in Patent Literature 1 and Patent Literature 2 have a problem in terms of their failure to provide oxygen reducing activity that is sufficient on a practical basis.

Catalysts described in Patent Literature 3 and Patent Literature 4, although showing high oxygen reducing catalytic activity, have a problem in terms of their extremely low stability under fuel cell operation conditions.

As the catalysts alternative to noble metals, Nb and Ti oxycarbonitrides in Patent Literature 5 and Patent Literature 6 have been attracting particular attention since they can effectively exhibit the above-mentioned performance.

Although the catalysts described in Patent Literature 5 and Patent Literature 6 have extremely high performance as compared with conventional catalysts alternative to noble metals, the production process thereof needs to include heating treatment under a high temperature of from 1600 to 1800° C. (for example, Example 1 of Patent Literature 5 or Example 1 of Patent Literature 6).

Performing such high-temperature heating treatment is not impossible on an industrial basis, but involves difficulty and invites increase in equipment cost and difficulty in operation control, leading to the increase in the production cost. Thus, the development of a process that achieves production at a lower cost has been desired.

Patent Literature 7 reports a technique relating to the production of a carbon-containing titanium oxynitride that contains carbon, nitrogen and oxygen.

However, according to the production process described in Patent Literature 7, the production of the carbon-containing titanium oxynitride requires two-stage synthesis: the preparation of a titanium oxynitride by reacting a nitrogen-containing organic compound with a titanium precursor, and the preparation of a carbon-containing titanium oxynitride by reacting a phenol resin with the titanium oxynitride precursor, and thus involves complicated steps. In particular, the preparation of the titanium oxynitride precursor requires complicated steps including stirring, heating and refluxing at 80° C. as well as cooling and concentrating under reduced pressure, thus resulting in high cost.

In addition, since the phenol resin is a thermosetting resin having a three-dimensional network structure, it is difficult to homogenously mix and react the phenol resin with a metal oxide. In particular, since the thermal decomposition temperature of the phenol resin ranges from 400 to 900° C., at a temperature of not higher than 1000° C., the carbonization reaction due to the complete decomposition of the phenol resin is unlikely to take place.

Patent Literature 7 and Non-Patent Literature 1 only describe applications to a thin film for a solar energy collector and a photocatalyst, failing to disclose or study a process for producing a metal oxycarbonitride having particulate or fibrous shape that is highly useful as an electrode catalyst and an application thereof.

Patent Literature 8 discloses a process for producing electrode catalyst characterized by calcining a mixed material of an oxide and a carbon material precursor. The production process, however, cannot provide an electrode catalyst having sufficient catalytic performance.

Patent Literature 9 discloses a fuel cell electrode catalyst obtained by using a polynuclear complex such as cobalt. This catalyst, however, has problems in terms of highly toxicity of the raw material, high cost and insufficient catalytic activity.

Non-Patent Literature 2 discloses a process for producing electrode catalyst characterized by calcining a mixed material of a titanium alkoxide and a carbon material precursor. The production process, however, does not use a nitrogen-containing organic substance and cannot provide an electrode catalyst having sufficient catalytic performance.

CITATION LIST

Patent Literatures

Patent Literature 1: JP-A-2004-303664
Patent Literature 2: WO07/072,665
Patent Literature 3: US-A-2004/0096728
Patent Literature 4: JP-A-2005-19332

Patent Literature 5: WO2009/031383
Patent Literature 6: WO2009/107518
Patent Literature 7: JP-A-2009-23887
Patent Literature 8: JP-A-2009-255053
Patent Literature 9: JP-A-2008-258150

Non-Patent Literatures

Non-Patent Literature 1: Journal of Inorganic Materials (Chinese) 20, 4, P785
Non-Patent Literature 2: Electrochemistry Communications Volume 12, Issue 9, September 2010, Pages 1177-1179

SUMMARY OF INVENTION

Technical Field

The present invention seeks to overcome such problems as seen in conventional techniques.

It is an object of the present invention to provide a process for producing a fuel cell electrode catalyst with high catalytic activity that is alternative to a noble metal catalyst, through a heat treatment at a relatively low temperature.

It is another object of the present invention to provide a fuel cell electrode catalyst with high catalytic activity and use thereof such as an electrode.

Solution to Problem

The present invention relates to, for example, the following [1] to [20].

[1] A process for producing a fuel cell electrode catalyst comprising:
a step (I) of obtaining a catalyst precursor, including a step (Ia) of mixing at least a metal compound (1), a nitrogen-containing organic compound (2), and a fluorine-containing compound (3), and
a step (II) of heat-treating the catalyst precursor at a temperature of 500 to 1300° C. to obtain an electrode catalyst,
a portion or the entirety of the metal compound (1) being a compound containing an atom of a metal element M1 selected from the group consisting of iron, cobalt, chromium, nickel, copper, zinc, titanium, niobium and zirconium, and
at least one of the compounds (1), (2) and (3) containing an oxygen atom.

[2] The process for producing a fuel cell electrode catalyst according to the above [1], wherein the fluorine-containing compound (3) contains none of a boron atom, a phosphorus atom and a sulfur atom.

[3] The process for producing a fuel cell electrode catalyst according to the above [1] or [2], wherein the fluorine-containing compound (3) satisfies the following (i) or (ii):
(i): being a solid or a liquid at 0.1 MPa at 150° C.;
(ii): having a decomposition temperature of 150° C. or higher and lower than 500° C. at 0.1 MPa.

[4] The process for producing a fuel cell electrode catalyst according to the above [2] or [3], wherein the fluorine-containing compound (3) is at least one kind selected from the group consisting of fluorine atom-containing alcohols, fluorine atom-containing ethers, fluorine atom-containing amines, fluorine atom-containing carboxylic acids and derivatives thereof.

[5] The process for producing a fuel cell electrode catalyst according to any one of the above [1] to [4], wherein in the step (Ia), a solvent is further mixed.

[6] The process for producing a fuel cell electrode catalyst according to the above [5], wherein the step (I) includes the step (Ia) and a step (Ib) of removing the solvent.

[7] The process for producing a fuel cell electrode catalyst according to the above [5] or [6], wherein in the step (Ia), a solution of the metal compound (1) is mixed with the nitrogen-containing organic compound (2).

[8] The process for producing a fuel cell electrode catalyst according to any one of the above [5] to [7], wherein in the step (Ia), a compound having a diketone structure is further mixed.

[9] The process for producing a fuel cell electrode catalyst according to any one of the above [1] to [8], wherein the metal compound (1) comprises metal compounds of two or more different kinds of metal elements, wherein a compound of a metal element that is not a metal element with the highest molar ratio of the different metals includes a compound of at least one transition metal element M2 selected from iron, nickel, chromium, cobalt and manganese.

[10] The process for producing a fuel cell electrode catalyst according to any one of the above [1] to [9], wherein the metal compound (1) is at least one selected from the group consisting of metal phosphates, metal sulfates, metal nitrates, metal organic acid salts, metal acid halides, metal alkoxides, metal halides, metal perhalates, metal hypohalites and metal complexes.

[11] The process for producing a fuel cell electrode catalyst according to any one of the above [1] to [10], wherein the nitrogen-containing organic compound (2) has, in the molecule, at least one kind selected from amino group, nitrile group, imide group, imine group, nitro group, amide group, azide group, aziridine group, azo group, isocyanate group, isothiocyanate group, oxyme group, diazo group, nitroso group, pyrrole ring, porphyrin ring, imidazole ring, pyridine ring, pyrimidine ring and pyrazine ring.

[12] The process for producing a fuel cell electrode catalyst according to any one of the above [1] to [11], wherein the nitrogen-containing organic compound (2) has, in the molecule, at least one group selected from hydroxyl group, carboxyl group, aldehyde group, acid halide group, sulfo group, phosphate group, ketone group, ether group and ester group.

[13] The process for producing a fuel cell electrode catalyst according to any one of the above [1] to [12], wherein in the step (II), the catalyst precursor is heat-treated in an atmosphere containing 0.01% by volume to 10% by volume of a hydrogen gas.

[14] A fuel cell electrode catalyst obtained by the production process according to any one of the above [1] to [13].

[15] A fuel cell catalyst layer comprising the fuel cell electrode catalyst according to the above [14].

[16] An electrode comprising the fuel cell catalyst layer according to the above (15) and a porous support layer.

[17] A membrane electrode assembly comprising a cathode, an anode and an electrolyte membrane interposed between the cathode and the anode, wherein the cathode and/or the anode is the electrode according to the above [16].

[18] A fuel cell comprising the membrane electrode assembly according to the above [17].

[19] The fuel cell according to the above [18], which is a polymer electrolyte fuel cell.

[20] An article equipped with a function selected from the group consisting of electricity generating function, light emitting function, heat generating function, sound generating function, movement function, display function and charging function, the article comprising the fuel cell according to the above (18) or (19).

Advantageous Effect of Invention

According to the process for producing a fuel cell electrode catalyst of the present invention, a fuel cell electrode catalyst having high catalytic activity alternative to noble metal catalysts can be produced through heat treatment at relatively low temperature.

Furthermore, the fuel cell electrode catalyst of the present invention has high catalytic activity and is useful for various uses (such as electrodes).

DESCRIPTION OF EMBODIMENTS

Figure 1:
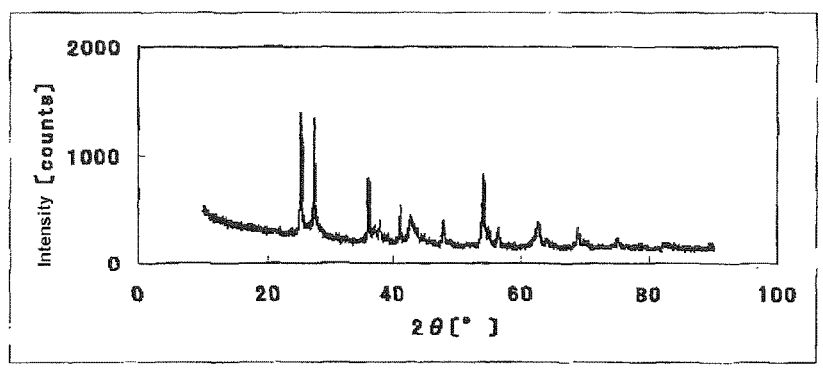
FIG. 1 is a powder X-ray diffraction spectrum of a catalyst (1) of Example 1.

Process for Producing Fuel Cell Electrode Catalyst

The process for producing a fuel cell electrode catalyst of the present invention comprises:
a step (I) of obtaining a catalyst precursor, including a step (Ia) of mixing at least a metal compound (1), a nitrogen-containing organic compound (2), and a fluorine-containing compound (3), and
a step (II) of heat-treating the catalyst precursor at a temperature of 500 to 1300° C. to obtain an electrode catalyst,
a portion or the entirety of the metal compound (1) being a compound (M1) containing an atom of a metal element M1 selected from the group consisting of iron, cobalt, chromium, nickel, copper, zinc, titanium, niobium and zirconium, and
at least one of the compounds (1), (2) and (3) containing an oxygen atom.

In the present specification, an atom and an ion are not strictly distinguished from each other unless special circumstance requires otherwise, and are referred to as an "atom".

(Step (I))

The step (I) includes a step (Ia) described below, and as needed further includes a step (Ib) described later.

(Step (Ia))

In the step (Ia), at least the metal compound (1), the nitrogen-containing organic compound (2), and the fluorine-containing compound (3), and optionally a solvent described later are mixed with one another to obtain a catalyst precursor.

The catalyst precursor may be obtained, for example by mixing raw materials of the catalyst precursor at a solid state, or by mixing raw materials of the catalyst precursor at a liquid state. In the mixing at a liquid state, a solvent may be used. In terms of mixing the raw materials more homogenously, preferably, the raw materials are mixed at a liquid state with the use of a solvent.

When a solvent is used, the resultant solution, dispersion, slurry and the like (these are also referred to as the "solution" without particular distinction) may be subjected to the step (II), i.e., heat treatment, as the catalyst precursor. Alternatively, the resultant solution from which a solvent is removed may be subjected to as the step (II), i.e., heat treatment, as the catalyst precursor.

Exemplary mixing procedures are:
procedure (i): putting the metal compound (1), the nitrogen-containing organic compound (2) and the fluorine-containing compound (3) into one container, and mixing them;
procedure (ii): preparing a solvent in one container, adding and dissolving thereto, the metal compound (1), the nitrogen-containing organic compound (2) and the fluorine-containing compound (3), and mixing them; and procedure (iii): preparing a solution of the metal compound (1), and a solution of the nitrogen-containing organic compound (2) and the fluorine-containing compound (3), and mixing them.

In the event that a solvent is used and a solvent does not allow each component to have high solubility therein, the procedure (iii) is preferable. In the event that a solvent is used, when the metal compound (1) is, for example, a metal halide described later, the procedure (ii) is preferable; and when the metal compound (1) is, for example, a metal alkoxide or a metal complex described later, the procedure (iii) is preferable.

When a metal compound (M1a) and a transition metal compound (M2), described later, are used as the metal compound (1), a preferable procedure in the procedure (iii) is:

procedure (iii'): preparing a solution of the metal compound (M1a), and a solution of the transition metal compound (M2), the nitrogen-containing organic compound (2) and the fluorine-containing compound (3), and mixing them.

When a solvent is used, the mixing operation is preferably performed with stirring, in order to increase the dissolution rate of each component in the solvent.

When multiple solutions are prepared and these solutions are then mixed to obtain a catalyst precursor, it is preferable that one solution is supplied to the other solution at a constant rate with a pump or the like.

It is also preferable that the solution of the metal compound (1) is added little by little to the solution of the nitrogen-containing organic compound (2), or to the solution of the nitrogen-containing organic compound (2) and the fluorine-containing compound (3) (i.e., the whole amount is not added at a time). When the transition metal compound (M2) described later is used, it is also preferable that the solution of the metal compound (M1a) is added little by little to the solution of the nitrogen-containing organic compound (2) and the transition metal compound (M2), or to the solution of the nitrogen-containing organic compound (2), the fluorine-containing compound (3) and the transition metal compound (M2) (i.e., the whole amount is not added at a time).

When a solvent is used, the catalyst precursor is considered to contain a reaction product of the metal compound (1) and the nitrogen-containing organic compound (2). The solubility of this reaction product in the solvent varies depending on the combination of the metal compound (1), the nitrogen-containing organic compound (2), a solvent and the like.

Thus, when the metal compound (1) is, for example, a metal alkoxide or a metal complex, it is preferable that the catalyst precursor in the form of a solution does not contain a precipitate and a dispersion medium, although this depends on the type of solvent and the type of the nitrogen-containing organic compound (2). Even if the precipitate and the dispersion medium are contained, it is preferable that the amount thereof is low (for example, the amount is 10% by mass or less, preferably 5% by mass or less, more preferably 1% by mass or less of the whole amount of the solution).

On the other hand, when the metal compound (1) is, for example, a metal halide, the catalyst precursor in the form of a solution easily has a precipitate generated therein, although this depends on the type of solvent and the type of the nitrogen-containing organic compound (2). The precipitate is considered to be the reaction product of the metal-containing compound (1) and the nitrogen-containing organic compound (2).

In the step (Ia), the metal compound (1), the nitrogen-containing organic compound (2), the fluorine-containing compound (3) and a solvent may be introduced in a pressure-applicable container such as an autoclave and pressurized at a pressure of ordinary pressure or more to mix these components.

The temperature in mixing the metal compound (1), the nitrogen-containing organic compound (2), the fluorine-containing compound (3) and a solvent is, for example, 0 to 60° C. In view of a complex being considered to be formed from the metal compound (1) and the nitrogen-containing organic compound (2), if this temperature is excessively high and the solvent contains water, it is considered that the complex is hydrolyzed to cause a hydroxide precipitate, whereas if this temperature is excessively low, it is considered that the metal compound (1) is precipitated before the complex is formed.

<Metal Compound (1)>

A portion or the entirety of the metal compound (1) is a metal compound (M1) containing a metal element M1 selected from the group consisting of iron, cobalt, chromium, nickel, copper, zinc, titanium, niobium and zirconium.

The metal compound (1) preferably contains at least one atom selected from an oxygen atom and a halogen atom. Specific examples thereof include metal phosphates, metal sulfates, metal nitrates, metal organic acid salts, metal acid halides (intermediate hydrolysates of metal halides), metal alkoxides, metal halides, metal perhalates, metal hypohalites and metal complexes. These may be used singly or two or more kinds may be used in combination.

As the metal alkoxides, methoxide, propoxide, isopropoxide, ethoxide, butoxide, and isobutoxide of the above-mentioned metals are preferable; and isopropoxide, ethoxide and butoxide of the above-mentioned metals are more preferable. The metal alkoxide may have one kind of alkoxy group, or may have two or more kinds of alkoxy groups.

As the metal organic acid salts, metal carboxylates are preferable, with more preferred examples including acetate, lactate and citrate.

As the metal compound (1) having an oxygen atom, metal alkoxides, acetylacetone complexes, metal acid chlorides, metal sulfates and metal nitrates are preferable. In terms of cost, metal alkoxides and acetylacetone complexes are more preferable. In terms of solubility in the solvent, metal alkoxides and acetylacetone complexes are more preferable.

As the metal halides, metal chlorides, metal bromides and metal iodides are preferable. As the metal acid halides, metal acid chlorides, metal acid bromides and metal acid iodides are preferable.

As the metal perhalates, metal perchlorates are preferable. As the metal hypohalites, metal hypochlorites are preferable.

Specific examples of the metal compound (M1) include:

iron compounds such as iron(III) methoxide, iron(III) ethoxide, iron(III) propoxide, iron(III) isopropoxide, iron(III) butoxide, iron(III) isobutoxide, iron(III) pentoxide, iron(III) acetylacetonate, iron(III) isopropoxide acetylacetonates (Fe(acac)(O-iPr)$_2$, Fe(acac)$_2$(O-iPr), wherein "acac" denotes acetylacetonato ion, and "iPr" denotes isopropyl group; the same applies hereinafter), trisdiethylamino iron, tris(2,2,6,6-tetramethyl-3,5-heptanedione)iron, iron(III) hexafluoroacetylacetonate, tri-1-methoxy-2-methyl-2-propoxy iron(III), iron trichloride, iron dichloride, iron oxychloride, iron tribromide, iron dibromide, iron oxybromide, iron triiodide, iron diiodide, and iron oxyiodide;

cobalt compounds such as cobalt(II) methoxide, cobalt(II) ethoxide, cobalt(II) propoxide, cobalt(II) isopropoxide, cobalt(II) butoxide, cobalt(II) isobutoxide, cobalt(II) pentoxide, cobalt(II) acetylacetonate, cobalt(III) acetylacetonate, cobalt(II) isopropoxide acetylacetonate (Co(acac)(O-iPr)), cobalt(III) isopropoxide acetylacetonates (Co(acac)(O-iPr)$_2$, Co(acac)$_2$(O-iPr)), bisdiethylamino cobalt, tris(2,2,6,6-tetramethyl-3,5-heptanedione)cobalt, cobalt(II) hexafluoroacetylacetonate, tri-1-methoxy-2-methyl-2-propoxycobalt(II), cobalt trichloride, cobalt dichloride, cobalt oxychloride, cobalt tribromide, cobalt dibromide, cobalt oxybromide, cobalt triiodide, cobalt diiodide, and cobalt oxyiodide;

chromium compounds such as chromium(III) methoxide, chromium(III) ethoxide, chromium(III) propoxide, chromium(III) isopropoxide, chromium(III) butoxide, chromium(III) isobutoxide, chromium(III) pentoxide, chromium(III) acetylacetonate, chromium(III) isopropoxide acetylacetonates (Cr(acac)(O-iPr)$_2$, Cr(acac)$_2$(O-iPr)), trisdiethylamino chromium, tris(2,2,6,6-tetramethyl-3,5-heptanedione)chromium, chromium(III) hexafluoroacetylacetonate, tri-1-methoxy-2-methyl-2-propoxychromium(III), chromium trichloride, chromium dichloride, chromium oxychloride, chromium tribromide, chromium dibromide, chromium oxybromide, chromium triiodide, chromium diiodide, and chromium oxyiodide;

nickel compounds such as nickel(II) methoxide, nickel(II) ethoxide, nickel(II) propoxide, nickel(II) isopropoxide, nickel(II) butoxide, nickel(II) isobutoxide, nickel(II) pentoxide, nickel(II) acetylacetonate, nickel(II) isopropoxide acetylacetonate (Ni(acac)(O-iPr)), bisdiethylamino nickel, bis(2,2,6,6-tetramethyl-3,5-heptanedione)nickel, nickel(II) hexafluoroacetylacetonate, bis-1-methoxy-2-methyl-2-propoxynickel(II), nickel dichloride, nickel oxychloride, nickel dibromide, nickel oxybromide, nickel diiodide, and nickel oxyiodide;

copper compounds such as copper(II) methoxide, copper(II) ethoxide, copper(II) propoxide, copper(II) isopropoxide, copper(II) butoxide, copper(II) isobutoxide, copper(II) pentoxide, copper(II) acetylacetonate, bisdiethylamino copper, bis(2,2,6,6-tetramethyl-3,5-heptanedione)copper, copper(II) hexafluoroacetylacetonate, bis-1-methoxy-2-methyl-2-propoxycopper(II), copper dichloride, copper oxychloride, copper dibromide, copper oxybromide, copper diiodide, and copper oxyiodide;

zinc compounds such as zinc methoxide, zinc ethoxide, zinc propoxide, zinc isopropoxide, zinc butoxide, zinc isobutoxide, zinc pentoxide, zinc acetylacetonate, bisdiethylamino zinc, bis(2,2,6,6-tetramethyl-3,5-heptanedione)zinc, zinc hexafluoroacetylacetonate, bis-1-methoxy-2-methyl-2-propoxyzinc, zinc dichloride, zinc oxychloride, zinc dibromide, zinc oxybromide, zinc diiodide, and zinc oxyiodide;

titanium compounds such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium diisopropoxide diacetylacetonate (Ti(acac)$_2$(O-iPr)$_2$), titanium oxydiacetylacetonate, bis[tris(2,4-pentanedionato)titanium(IV)]hexachlorotitanate(IV) ([Ti(acac)$_3$]$_2$[TiCl$_6$]), titanium tetrachloride, titanium trichloride, titanium oxychloride, titanium tetrabromide, titanium tribromide, titanium oxybromide, titanium tetraiodide, titanium triiodide, and titanium oxyiodide;

niobium compounds such as niobium pentamethoxide, niobium pentaethoxide, niobium pentaisopropoxide, niobium pentabutoxide, niobium pentapentoxide, niobium triacetylacetonate, niobium pentaacetylacetonate, niobium diisopropoxide triacetylacetonate (Nb(acac)$_3$(O-iPr)$_2$), tris(2,2,6,6-tetramethyl-3,5-heptanedione)niobium, niobium (III) hexafluoroacetylacetonate, niobium pentachloride, niobium oxychloride, niobium pentabromide, niobium oxybromide, niobium pentaiodide, and niobium oxyiodide;

zirconium compounds such as zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetylacetonate, zirconium diisopropoxide diacetylacetonate (Zr(acac)$_2$(O-iPr)$_2$), tetrakisdiethylamino zirconium, tetrakis(2,2,6,6-tetramethyl-3,5-heptanedione)zirconium, zirconium(IV) hexafluoroacetylacetonate, tetra-1-methoxy-2-methyl-2-propoxyzirconium(IV), zirconium tetrachloride, zirconium oxychloride, zirconium tetrabromide, zirconium oxybromide, zirconium tetraiodide, and zirconium oxyiodide.

These may be used singly or in combination of two or more kinds.

Of these compounds, in view of allowing the resultant catalyst to be fine particles having a uniform particle diameter and to have high activity, preferred are:

iron trichloride, iron dichloride, iron oxychloride, iron(III) ethoxide, iron(III) isopropoxide, iron(III) butoxide, iron(III) acetylacetonate, and iron(III) isopropoxide acetylacetonates (Fe(acac)(O-iPr)$_2$, Fe(acac)$_2$(O-iPr));

cobalt trichloride, cobalt dichloride, cobalt oxychloride, cobalt(II) ethoxide, cobalt(II) isopropoxide, cobalt(II) butoxide, cobalt(III) acetylacetonate, cobalt(II) isopropoxide acetylacetonate (Co(acac)(O-iPr)), and cobalt(III) isopropoxide acetylacetonates (Co(acac)(O-iPr)$_2$, Co(acac)$_2$(O-iPr));

chromium trichloride, chromium dichloride, chromium oxychloride, chromium(III) ethoxide, chromium(III) isopropoxide, chromium(III) butoxide, chromium(III) acetylacetonate, and chromium(III) isopropoxide acetylacetonate (Cr(acac)(O-iPr)$_2$);

nickel dichloride, nickel oxychloride, nickel(II) ethoxide, nickel(II) isopropoxide, nickel(II) butoxide, nickel(II) acetylacetonate, and nickel(II) isopropoxide acetylacetonate (Ni(acac)(O-iPr));

copper dichloride, copper oxychloride, copper(II) ethoxide, copper(II) isopropoxide, copper(II) butoxide, and copper(II) acetylacetonate;

zinc dichloride, zinc oxychloride, zinc ethoxide, zinc isopropoxide, zinc butoxide, zinc isobutoxide, and zinc acetylacetonate;

titanium tetraethoxide, titanium tetrachloride, titanium oxychloride, titanium tetraisopropoxide, titanium tetraacetylacetonate, and titanium diisopropoxide diacetylacetonate (Ti(acac)$_2$(O-iPr)$_2$);

niobium pentaethoxide, niobium pentachloride, niobium oxychloride, niobium pentaisopropoxide, niobium pentaacetylacetonato, niobium triacetylacetonate, and niobium diisopropoxide triacetylacetonate (Nb(acac)$_3$(O-iPr)$_2$); and zirconium tetraethoxide, zirconium tetrachloride, zirconium oxychloride, zirconium tetraisopropoxide, zirconium tetraacetylacetonate, and zirconium diisopropoxide diacetylacetonate (Zr(acac)$_2$(O-iPr)$_2$).

Still more preferred are:

iron trichloride, iron dichloride, iron(III) ethoxide, iron(III) isopropoxide, iron(III) butoxide, iron(III) acetylacetonate, cobalt trichloride, cobalt dichloride, cobalt(II) ethoxide, cobalt(II) isopropoxide, cobalt(II) butoxide, cobalt(III) acetylacetonate, chromium trichloride, chromium dichloride, chromium(III) ethoxide, chromium(III) acetylacetonate, nickel dichloride, nickel(II) ethoxide, nickel(II) isopropoxide, nickel(II) butoxide, nickel(II) acetylacetonate, copper dichloride, copper oxychloride, copper(II) ethoxide, copper(II) isopropoxide, copper(II) acetylacetonate, zinc dichloride, zinc ethoxide, zinc isopropoxide, zinc butoxide, zinc isobutoxide, zinc acetylacetonate, titanium pentachloride, titanium tetraisopropoxide, titanium tetraacetylacetonate, niobium pentaethoxide, niobium pentaisopropoxide, zirconium tetrachloride, zirconium oxychloride, and zirconium tetraisopropoxide.

It is preferable that the metal compound (1) is the combination of metal compounds of two or more different kinds of metal elements, where a compound of at least one transition metal element M2 selected from iron, nickel, chromium, cobalt and manganese (hereinafter, also referred to as the "transition metal compound (M2)") is used as a compound of a metal element that is not a metal element with the highest molar ratio of the different metal elements (said molar ratio being a ratio of the total atomic number of a specific kind of metal element contained in the metal compound (1) used in the step (Ia) relative to the total atomic number of metal elements contained in the metal compound (1) used in the step (Ia)) (hereinafter, said metal element with the highest molar ratio is also referred to as the "metal element M1"). Including the transition metal compound (M2) as the metal compound (1) improves the performance of the resultant catalyst.

The transition metal element M2 is preferably iron and chromium, more preferably iron, in terms of the balance between cost and the performance of the resultant catalyst.

Specific examples of the transition metal compound (M2) include:

iron compounds such as iron(III) ethoxide, iron(III) isopropoxide acetylacetonates (Fe(acac)(O-iPr)$_2$, Fe(acac)$_2$(O-iPr)), iron(III) acetylacetonate, tris(2,2,6,6-tetramethyl-3,5-heptanedione)iron(III), iron(III) hexafluoroacetylacetonate, iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron(II) nitrate, iron(III) nitrate, iron(II) oxalate, iron(III) oxalate, iron(II) phosphate, iron (III) phosphate, ferrocene, iron(II) hydroxide, iron(III) hydroxide, iron(II) oxide, iron(III) oxide, triiron tetraoxide, iron(II) acetate, iron(II) lactate, and iron(III) citrate;

nickel compounds such as nickel(II) ethoxide, nickel(II) isopropoxide acetylacetonate (Ni(acac)(O-iPr)), nickel(II) acetylacetonate, nickel(II) chloride, nickel(II) sulfate, nickel (II) sulfide, nickel(II) nitrate, nickel(II) oxalate, nickel(II) phosphate, nickelocene, nickel(II) hydroxide, nickel(II) oxide, nickel(II) acetate, and nickel(II) lactate;

chromium compounds such as chromium(III) ethoxide, chromium(III) isopropoxide acetylacetonates (Cr(acac)(O-iPr)$_2$, Cr(acac)$_2$(O-iPr)), chromium(III) acetylacetonate, chromium(II) chloride, chromium(III) chloride, chromium (III) sulfate, chromium(III) sulfide, chromium(III) nitrate, chromium(III) oxalate, chromium(III) phosphate, chromium (III) hydroxide, chromium(II) oxide, chromium(III) oxide, chromium(IV) oxide, chromium(VI) oxide, chromium(II) acetate, chromium(III) acetate, and chromium (III) lactate;

cobalt compounds such as cobalt(III) ethoxide, cobalt(III) isopropoxide acetylacetonates (Co(acac)(O-iPr)$_2$, Co(acac)$_2$(O-iPr)), cobalt(III) acetylacetonate, cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetraoxide, cobalt(II) acetate, and cobalt(II) lactate;

manganese compounds such as manganese(III) ethoxide, manganese(III) isopropoxide acetylacetonates (Mn(acac) (O-iPr)$_2$, Mn(acac)$_2$(O-iPr)), manganese(III) acetylacetonate, tris(2,2,6,6-tetramethyl-3,5-heptanedione)manganese (III), manganese(III) hexafluoroacetylacetone, manganese (II) chloride, manganese(II) sulfate, manganese(II) sulfide, manganese(II) nitrate, manganese(II) oxalate, manganese (II) hydroxide, manganese(II) oxide, manganese(III) oxide, manganese(II) acetate, manganese(II) lactate, and manganese citrate.

These may be used singly or two or more kinds may be used in combination.

Of these compounds, preferred are:

iron(III) ethoxide, iron(III) isopropoxide acetylacetonate, iron(III) acetylacetonate, iron(II) chloride, iron(III) chloride, potassium ferrocyanide, potassium ferricyanide, ammonium ferrocyanide, ammonium ferricyanide, iron(II) acetate, and iron(II) lactate;

nickel(III) ethoxide, nickel(III) isopropoxide acetylacetonate, nickel(III) acetylacetonate, nickel(II) chloride, nickel (III) chloride, nickel(II) acetate, nickel(II) lactate, and nickel (II) nitrate;

chromium(III) ethoxide, chromium(III) isopropoxide acetylacetonate, chromium(III) acetylacetonate, chromium (II) chloride, chromium(III) chloride, chromium(II) acetate, chromium(III) acetate, and chromium(III) lactate;

cobalt(III) ethoxide, cobalt(III) isopropoxide acetylacetonate, cobalt(III) acetylacetonate, cobalt(II) chloride, cobalt (III) chloride, cobalt(II) acetate, and cobalt(II) lactate; and manganese(III) ethoxide, manganese(III) isopropoxide acetylacetonate, manganese(III) acetylacetonate, manganese (II) chloride, manganese(II) acetate, and manganese(II) lactate.

Further preferred are iron(II) chloride, iron(III) chloride, potassium ferrocyanide, potassium ferricyanide, ammonium ferrocyanide, ammonium ferricyanide, iron(II) acetate, iron (II) lactate, chromium(II) chloride, chromium(III) chloride, chromium(II) acetate, chromium(III) acetate, and chromium (III) lactate.

<Nitrogen-Containing Organic Compound (2)>

As the nitrogen-containing organic compound (2), preferred is a compound capable of becoming a ligand that can be coordinated to a metal atom in the metal compound (1) (preferably, a compound capable of forming a mononuclear complex); and further preferred is a compound capable of becoming a multidentate ligand (preferably, a bidentate ligand or a tridentate ligand) (compound capable of forming a chelate).

The nitrogen-containing organic compounds (2) may be used singly or two or more kinds may be used in combination.

The nitrogen-containing organic compound (2) preferably has a functional group such as amino group, nitrile group, imide group, imine group, nitro group, amide group, azide group, aziridine group, azo group, isocyanate group, isothiocyanate group, oxyme group, diazo group and nitroso group, or a ring such as pyrrole ring, porphyrin ring, pyrrolidine ring, imidazole ring, triazole ring, pyridine ring, piperidine ring, pyrimidine ring, pyrazine ring and purine ring (these functional groups and rings are also collectively referred to as a "nitrogen-containing molecular group").

The nitrogen-containing organic compound (2), by containing the nitrogen-containing molecular group in the molecule, after subjected to the mixing in the step (I), is considered to be more strongly coordinated to a metal atom derived from the metal compound (1).

Among the nitrogen-containing molecular group, amino group, imine group, amide group, pyrrole ring, pyridine ring and pyrazine ring are more preferable; and amino group, imine group, pyrrole ring and pyrazine ring are still more preferable. Amino group and pyrazine ring are particularly preferable because of allowing the resultant catalyst to have particularly high activity.

Specific examples of the nitrogen-containing organic compound (2) wherein the compound does not contain an oxygen atom include melamine, ethylenediamine, triazole, acetonitrile, acrylonitrile, ethyleneimine, aniline, pyrrole, polyethyleneimine and salts thereof. Of these, ethylenediamine and ethylenediamine dihydrochloride are preferable because of allowing the resultant catalyst to have high activity.

The nitrogen-containing organic compound (2) preferably further has hydroxyl group, carboxyl group, aldehyde group, acid halide group, sulfo group, phosphate group, ketone group, ether group or ester group (these are also collectively referred to as an "oxygen-containing molecular group"). The nitrogen-containing organic compound (2), by containing the oxygen-containing molecular group in the molecule, after subjected to the mixing in the step (Ia), is considered to be more strongly coordinated to a metal atom derived from the metal compound (1).

Among the oxygen-containing molecular group, carboxyl group and aldehyde group are particularly preferable because of allowing the resultant catalyst to have particularly high activity.

As the nitrogen-containing organic compound (2) that contains an oxygen atom in the molecule, compounds having the nitrogen-containing molecular group and the oxygen-containing molecular group are preferable. Such compounds, after subjected to the step (Ia), are considered to be particularly strongly coordinated to a metal atom derived from the metal compound (1).

As the compounds having the nitrogen-containing molecular group and the oxygen-containing molecular group, amino acids having amino group and carboxyl group, and derivatives thereof are preferable.

As the amino acids, preferred are alanine, arginine, asparagine, asparagine acid, cysteine, cystine, glutamine, glutamic acid, glycine, histidine, isoleucine, leucine, lysine, methionine, phenylalanine, serine, threonine, tryptophan, tyrosine, valine, norvaline, glycylglycine, triglycine and tetraglycine. Because of allowing the resultant catalyst to have high activity, alanine, glycine, lysine, methionine, tyrosine are more preferable. Because of allowing the resultant catalyst to have extremely high activity, alanine, glycine and lysine are particularly preferable.

As the nitrogen-containing organic compound (2) that contains an oxygen atom in the molecule, specific examples include, in addition to the above amino acids, acylpyrroles such as acetylpyrrole, pyrrolecarboxylic acid, acylimidazoles such as acetylimidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol, and polyvinylpyrrolidone. Because of allowing the resultant catalyst to have high activity, preferred are compounds capable of becoming a bidentate ligand: specifically, preferred are pyrrole-2-carboxylic acid, imidazole-4-carboxylic acid, 2-pyrazinecarboxylic acid, 2,3-pyrazinedicarboxylic acid, 2-piperidinecarboxylic acid, 2-piperazinecarboxylic acid, nicotinic acid, 2-pyridinecarboxylic acid, 2,4-pyridinedicarboxylic acid and 8-quinolinol; and more preferred are 2-pyrazinecarboxylic acid, 2,3-pyrazinedicarboxylic acid and 2-pyridinecarboxylic acid.

The ratio (B/A) of the total atomic number "B" of carbon of the nitrogen-containing organic compound (2) used in the step (Ia) to the total atomic number "A" of metal element of the metal compound (1) used in the step (Ia) is preferably 200 or less, more preferably 150 or less, still more preferably 80 or less, particularly preferably 30 or less, in terms of allowing the heat treatment in the step (II) to be performed while decreasing components eliminating as carbon compounds such as carbon dioxide and carbon monoxide, i.e., decreasing an emission gas during catalyst production. The ratio is preferably 1 or more, more preferably 2 or more, still more preferably 3 or more, particularly preferably 5 or more in terms of obtaining a catalyst having good activity.

The ratio (C/A) of the total atomic number "C" of nitrogen of the nitrogen-containing organic compound (2) used in the step (Ia) to the total atomic number "A" of metal element of the metal compound (1) used in the step (Ia) is preferably 28 or less, more preferably 17 or less, still more preferably 12 or less, particularly preferably 8.5 or less, in terms of obtaining a catalyst having good activity. The ratio is preferably 1 or more, more preferably 2.5 or more, still more preferably 3 or more, particularly preferably 3.5 or more, in terms of obtaining a catalyst having good activity.

When the ratio of the metal compound (M2) in the metal compound (1) used in the step (Ia) is converted into a metal atom ratio α (ratio of total atomic number of the metal element M2 relative to the total atomic number of metal elements of the metal compound (1)), the range of α is preferably $0.01 \leq \alpha \leq 0.45$, more preferably $0.02 \leq \alpha \leq 0.4$, particularly preferably $0.05 \leq \alpha \leq 0.3$.

<Fluorine-Containing Compound (3)>

According to the process for producing the catalyst of the present invention that uses the fluorine-containing compound (3), an electrode catalyst having much higher catalytic activity is produced than when the fluorine-containing compound (3) is not used.

As the fluorine-containing compound (3) (namely, compound containing a fluorine atom), fluorine-containing compounds containing none of a boron atom, a phosphorus atom and a sulfur atom can be used.

The fluorine-containing compound (3) preferably satisfies (i) or (ii) described below:

(i): being a solid or a liquid at 0.1 MPa and at 150° C. (more preferably 200° C., still more preferably 250° C.)

(ii): having a decomposition temperature of 150° C. or higher (more preferably 200° C. or higher, still more preferably 250° C. or higher), and less than 500° C. at 0.1 MPa.

When the fluorine-containing compound (3) satisfies the above (i) or (ii), it is considered that more fluorine atoms can remain in the resultant electrode catalyst.

Examples of the fluorine-containing compound (3) are, preferably, fluorine atom-containing alcohols, fluorine atom-containing ethers, fluorine atom-containing amines and fluorine atom-containing carboxylic acids, and derivatives thereof.

Examples of the fluorine atom-containing alcohols and derivatives thereof include saturated or unsaturated aliphatic alcohols (the number of carbon atoms is, for example, 1 to 30) in which all or part of the hydrogen atoms of the hydrocarbon group are replaced with a fluorine atom, for example fluoroalkyl alcohols such as nonacosadecafluorotetradecylalcohol, nonacosadecafluorotetradecylalcohol, heptacosadecafluorotridecylalcohol, pentacosadecafluorododecylalcohol, tricosadecafluoroundecanealcohol, henicosadecafluorodecylalcohol, nonadecafluorononylalcohol, heptadecafluorooctylalcohol, pentadecafluoroheptylalcohol, tridecafluorohexylalcohol, undecafluoropentylalcohol, nonafluorobutylalcohol, heptafluoropropylalcohol, pentafluoroethylalcohol, trifluoromethylalcohol, 2,2,2-trifluoroethylalcohol, 6-perfluorohexylhexanol, 2,5-di(trifluoromethyl)-3,6-dioxoundecafluorononanol, perfluoromethylethylhexanol, dodecafluoroheptanol, octafluorohexanediol and dodecafluorooctanediol.

These may be used singly or in combination of two or more kinds.

The fluorine atom-containing alcohols or derivatives thereof preferably have three or more fluorine atoms in one molecule.

The fluorine atom-containing ether is represented by $R^f$—O—$R^{f'}$, wherein $R^f$ and $R^{f'}$ are each independently a hydrocarbon group in which all or part of the hydrogen atoms are replaced with a fluorine atom. Examples of $R^f$ and $R^{f'}$ are fluoroalkyl groups such as nonacosadecafluorotetradecyl group, heptacosadecafluorotridecyl group, pentacosadecafluorododecyl group, tricosadecafluoroundecyl group, henicosadecafluorodecyl group, nonadecafluorononyl group, heptadecafluorooctyl group, pentadecafluoroheptyl group, tridecafluorohexyl group, undecafluoropentyl group, nonafluorobutyl group, heptafluoropropyl group, pentafluoroethyl group, trifluoromethyl group and 2,2,2-trifluoroethyl group. $R^f$ and $R^{f'}$ may be a group having an aryl group (for example, phenyl group, pyridyl group).

Examples of the fluorine atom-containing ether include:

alternating copolymers having a structure represented by the formula $[—[(CF_2—CF_2)—(CH_2—CH(OR))_n—]$ and obtained by alternating copolymerization of tetrafluoroethylene ($CF_2$=$CF_2$) and vinyl ether ($CH_2$=CHOR) (for example, Lumiflon (registered trade mark) Asahi Glass Co., Ltd.), fluorine polyaryl ether ketones, fluorine polycyanoaryl ethers, 3-(2-perfluorohexylethoxy)-1,2-dihydroxypropane, compounds represented by:

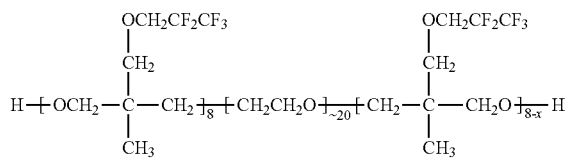

and compounds represented by:

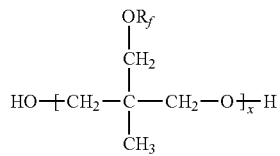

(wherein $R_f$=—$CH_2CF_3$ or —$CH_2CF_2CF_3$)

Examples of commercially available products are Novec™ HFE (product name) (hydrofluoroether, Ryoko Chemical Co., Ltd.), and Novec™ HFE (product name) (hydrofluoroether, 3M)

As the fluorine atom-containing ether, SURFLON (registered trade mark) S-241, S-242, S-243, S-420 (AGC SEIMI CHEMICAL CO., LTD.), Ftergent (registered trade mark) 250 (Neos Corporation), which are fluorine-containing surfactants, may be used.

These may be used singly or in combination of two or more kinds.

The fluorine atom-containing ethers or derivatives thereof preferably have three or more fluorine atoms in one molecule.

Examples of the fluorine atom-containing amines and derivatives thereof include saturated or unsaturated aliphatic amines (the number of carbon atoms is, for example, 1 to 30) represented by the formula "$R^f$—$NR^1R^2$", wherein $R^f$ is a saturated or unsaturated aliphatic hydrocarbon group in which all or part of the hydrogen atoms are replaced with a fluorine atom; and $R^1$ and $R^2$ are each independently a hydrogen atom, or a hydrocarbon group having 1 to 10 carbon atoms in which all or part of the hydrogen atoms may be replaced with a fluorine atom). Examples thereof include fluoroalkyl amines such as nonacosadecafluorotetradecylamine, heptacosadecafluorotridecylamine, pentacosadecafluorododecylamine, tricosadecafluoroundecylamine, henicosadecafluorodecylamine, nonadecafluorononylamine, heptadecafluorooctylamine, pentadecafluoroheptylamine, tridecafluorohexylamine, undecafluoropentylamine, nonafluorobutylamine, heptafluoropropylamine, pentafluoroethylamine, trifluoromethylamine and 2,2,2-trifluoroethylamine; and salts of the fluoroalkyl amines (general formula: $A^+[R_4N]^-$; wherein "$A^+$" denotes, for example, sodium ion, potassium ion, ammonium ion; Rs denote each independently a fluoroalkyl group in the fluoroalkyl amine) (for example, hydrochlorides, sulfates, carboxylates, and phosphates).

As the fluorine atom-containing amine or salts thereof, for example, SURFLON (registered trade mark) S-221, (AGC SEIMI CHEMICAL CO., LTD.), and Ftergent (registered trade mark) 300 (Neos Corporation), which are fluorine-containing surfactants, may be used.

These may be used singly or in combination of two or more kinds.

The fluorine atom-containing amines or derivatives thereof preferably have three or more fluorine atoms in one molecule.

Examples of the fluorine atom-containing carboxylic acid and derivatives thereof include saturated or unsaturated aliphatic carboxylic acid (the number of carbon atoms is, for example, 1 to 30) in which all or part of the hydrogen atoms of the hydrocarbon group is replaced with a fluorine atom. Examples thereof include:

fluoroalkyl carboxylic acids such as nonacosadecafluorotetradecanoic acid, nonacosadecafluorotetradecanoic acid, heptacosadecafluorotridecanoic acid, pentacosadecafluorododecanoic acid, tricosadecafluoroundecanoic acid, henicosadecafluorodecanoic acid, nonadecafluorononanoic acid, heptadecafluorooctanoic acid, pentadecafluoroheptanoic acid, tridecafluorohexanoic acid, undecafluoropentanoic acid, nonafluorobutanoic acid, heptafluoropropanoic acid, pentafluoroacetic acid, trifluoroacetic acid, 2,2,2-trifluoroethylcarboxylic acid, tetrafluorocitric acid, hexafluoroglutamic acid and octafluoroadipic acid;

aromatic carboxylic acids in which part or all of the hydrogen atoms in an aryl group are replaced with a fluoroalkyl group in the fluoroalkyl carboxylic acid, examples thereof being trifluoromethylbenzoic acid, trifluoromethylsalicylic acid, and trifluoromethylnicotinic acid;

esters of the aliphatic carboxylic acids (for example, methyl esters, ethyl esters, and aryl esters (for example, phenyl ester), esters of the fluorine atom-containing alcohols), examples thereof being methyl heptadecafluoroctanoate, ethyl heptadecafluorooctanoate, phenyl heptadecafluorooctanoate, and heptadecafluorooctyl heptadecafluorooctanoate;

fluorine polyaryl ether polyaryl ether esters;

salts of the aliphatic carboxylic acids (for example, sodium salts, potassium salts, ammonium salts, alkyl ammoniums (e.g., methyl ammonium, dimethyl ammonium, trimethyl ammonium, ethyl ammonium, diethyl ammonium, and triethylammonium) salts, and salts of the fluoroalkyl amines), such as ammonium heptadecafluorooctanoate, sodium heptadecafluorooctanoate, and triethylammonium heptadecafluorooctanoate;

amides of the aliphatic carboxylic acids (general formula: $R^f$—CO—$NR^1R^2$, wherein $R^f$ denotes a fluoroalkyl group in the aliphatic carboxylic acid; $R^1$ and $R^2$ denote each independently a hydrocarbon group having 1 to 10 carbon atoms (for example, methyl group, ethyl group, phenyl group) in which all or part of the hydrogen atoms may be replaced with a fluorine atom, such as heptadecafluorooctanoic acid amide, heptadecafluorooctanoic acid diethylamide, heptadecafluorooctanoic acid heptadecafluorooctyl amide;

fluorine polyaryl ether amides;

fluorine polyaryl ether imides;

acid anhydrides of the aliphatic carboxylic acid (general formula: $(R^f$—CO$)_2$O, wherein $R^f$ denotes a fluoroalkyl group in the aliphatic carboxylic acid), such as heptadecafluorooctanoic anhydride;

amino acids (for example, amino acids having a fluoroalkyl group in the fluoroalkyl carboxylic acid); and organic compounds (which may be polymer compounds) having a substituent capable of being derived from the carboxylic acids and derivatives thereof.

As the fluorine atom-containing carboxylic acids or derivatives thereof, for example, SURFLON (registered trade mark) S-211, S-212 (amino acid-based agent, AGC SEIMI CHEMICAL CO., LTD.), and Ftergent (registered trade mark) 501, 150 (Neos Corporation), which are fluorine-containing surfactants, may be used.

These may be used singly or in combination of two or more kinds.

The fluorine atom-containing carboxylic acids or derivatives thereof preferably have three or more fluorine atoms in one molecule.

Further, the amount of a fluorine atom contained in the compound (3) (i.e., the total atomic number of fluorine contained in the compound (3) used in the step (Ia)) is usually 0.01 to 5 mol, preferably 0.02 to 4 mol, further preferably 0.03 to 3 mol, based on 1 mol of metal atom in the metal compound (1) used in the step (Ia).

The above-described amount of the compound (3) is an amount in the case where raw materials other than the compound (3) used in the step (Ia) contain no fluorine. If the raw materials other than the compound (3) contain fluorine, it is preferable to appropriately reduce the amount of the compound (3) used in the step (Ia).

<Solvent>

Examples of the solvent that may be used in the step (Ia) include water, alcohols and acids. As the alcohols, ethanol, methanol, butanol, propanol and ethoxyethanol are preferable; and ethanol and methanol are more preferable. As the acids, acetic acid, nitric acid (aqueous solution), hydrochloric acid, phosphoric acid aqueous solution and citric acid aqueous solution are preferable; and acetic acid and nitric acid are more preferable. These may be used singly or two or more kinds may be used in combination.

When the metal compound (1) is a metal halide, the solvent is preferably methanol.

The solvent may be used so that the amount thereof is, for example, 50 to 95% by mass in 100% by mass of the catalyst precursor in the form of a solution.

<Precipitation Suppressant>

If the solvent is used and the metal compounds (1) contain a halogen atom, these compounds are easily hydrolyzed by water to cause precipitates of hydroxides, acid chlorides and the like. Thus, when the metal compounds (1) contain a halogen atom and the prevention of the occurrence of precipitates is desired, it is preferable that 1% by mass or more of a strong acid is added to the solution. For example, when the acid is hydrochloric acid, by adding the acid in such a manner that the concentration of hydrogen chloride in the solution is 5% by mass or more, more preferably 10% by mass or more, the catalyst precursor in the form of a solution can be obtained while preventing the occurrence of precipitates derived from the metal compound (1), such as hydroxides and acid chlorides.

When the metal compound (1) contains a halogen atom, alcohols alone may be used as the solvent without adding an acid to obtain the catalyst precursor in the form of a solution.

When the metal compound (1) is a metal complex with the solvent being water alone or a combination of water and another compound, it is also preferable to use a precipitation suppressant in order to prevent the occurrence of precipitates of hydroxides or acid chlorides. In this case, the precipitation suppressant is preferably a compound having a diketone structure; more preferably diacetyl, acetylacetone, 2,5-hexanedione or dimedone; still more preferably acetylacetone or 2,5-hexanedione.

The precipitation suppressant is added so that the amount of the precipitation suppressant becomes preferably 1 to 70% by mass, more preferably 2 to 50% by mass, still more preferably 15 to 40% by mass, in 100% by mass of the metal compound solution (solution that contains the metal compound (1) but does not contain the nitrogen-containing organic compound (2) and the fluorine-containing compound (3)).

The precipitation suppressant is added so that the amount of the precipitation suppressant becomes preferably 0.1 to 40% by mass, more preferably 0.5 to 20% by mass, still more preferably 2 to 10% by mass in 100% by mass of the catalyst precursor in the form of a solution.

The precipitation suppressant may be added at any stage of the step (Ia).

In the step (Ia), preferably, a solution that contains the metal compound (1) and the precipitation suppressant is prepared, and this solution is then mixed with the nitrogen-containing organic compound (2) and the fluorine-containing compound (3) to obtain the catalyst precursor in the form of a solution. By performing the step (Ia) in this way, the occurrence of precipitates can be more surely prevented.

(Step (Ib))

When the catalyst precursor contains a solvent, prior to the step (II), the solvent may be removed from the catalyst precursor in the form of a solution.

The solvent removal may be performed in air, or may be performed under an atmosphere of a gas that is inert at a solvent removal temperature (for example, nitrogen, argon, helium). As the inert gas, in terms of cost, nitrogen gas and argon gas are preferable; and nitrogen gas is more preferable.

The temperature in the solvent removal may be ordinary temperature when the vapor pressure of the solvent is large, but in terms of mass production of the catalyst, temperature is preferably 30° C. or higher, more preferably 40° C. or higher, still more preferably 50° C. or higher. In terms of preventing the decomposition of a substance considered to be a metal complex such as a chelate contained in the solution obtained when the solvent is used in the step (Ia), the temperature is preferably 350° C. or lower, more preferably 150° C. or lower, still more preferably 110° C. or lower.

The solvent removal may be performed under atmospheric pressure when the vapor pressure of the solvent is large, but may be performed under reduced pressure (e.g., 0.1 Pa to 0.1 MPa) in order to remove the solvent within a shorter period of time. For the solvent removal under reduced pressure, for example, an evaporator may be used.

The solvent removal may be performed with the mixture obtained in the step (Ia) being allowed to stand still. However, in order to obtain a more homogenous solid residue, preferred is the solvent removal with the mixture being rotated.

When the mass of a container holding the mixture is large, it is preferable that the solution is rotated by using a stirring rod, a stirring blade, a stirring bar or the like.

When the solvent removal is performed while regulating the vacuum degree of a container holding the mixture, in which case the drying is performed in a sealable container, it is preferable that the solvent removal is performed while the whole container is rotated: for example, it is preferable that the solvent removal is performed by using e.g., a rotary evaporator.

Depending on solvent-removal methods or properties of the metal compound (1), the nitrogen-containing organic compound (2) or the fluorine-containing compound (3), the solid residue obtained in the step (Ib) may have a non-uniform composition or be at a non-uniform agglomeration state. In this case, the solid residue may be subjected to mixing and crushing to provide more uniform and finer powders to be used in the step (II), whereby a catalyst can be obtained which has more uniform particle diameter.

For the mixing and crushing of the solid residue, for example, a roll-rotating mill, a ball mill, a small-diameter ball mill (bead mill), a medium-stirring mill, an air flow crusher, a mortar, an automatic kneading mortar, a crushing tank, or a jet mill is employable. When the solid residue has been provided in a small amount, a mortar, an automatic kneading mortar or a batch-type ball mill is preferably used. When the solid residue has been provided in a large amount and is to be subjected to continuous mixing and crushing treatment, a jet mill is preferably used.

(Step (II))

In the step (II), the catalyst precursor obtained in the step (I) is heat-treated to provide an electrode catalyst.

The temperature in this heat treatment is 500 to 1300° C., preferably 600 to 1050° C., more preferably 700 to 950° C.

If the temperature in this heat treatment is so higher than the above range, calcining and particle growth occur between particles of the resultant electrode catalyst, consequently decreasing the specific surface area of the electrode catalyst. This leads to inferior processability when the particles are processed to a catalyst layer by coating method. On the other hand, if the temperature in this heat treatment is so lower than the above range, a catalyst which has high activity cannot be obtained.

Exemplary methods of the heat treatment method include standing method, stirring method, dropping method and powder capturing method.

Under the standing method, the catalyst precursor obtained in the step (II) (preferably, the catalyst precursor obtained without using a solvent in the step (Ia), or the catalyst precursor in the form of a solid residue obtained through solvent removal in the step (Ib)) placed in a stationary electric furnace or the like is heated. During heating, the catalyst precursor that has been weighed may be placed in a ceramic container such as an alumina board and a quartz board. The standing method is preferable in terms of being able to heat a large amount of the catalyst precursor.

Under the stirring method, the catalyst precursor (preferably, the catalyst precursor obtained without using a solvent in the step (Ia), or the catalyst precursor in the form of a solid residue obtained through solvent removal in the step (Ib)) introduced into an electric furnace such as a rotary kiln is heated while being stirred. The stirring method is preferable in terms of being able to heat a large amount of the catalyst precursor, and also in terms of being able to prevent the aggregation and growth of the particles of the resultant electrode catalyst. Furthermore, the stirring method is preferable also in terms of being able to continuously produce the electrode catalyst by sloping a furnace.

Under the dropping method, an induction furnace is heated to a predetermined heating temperature while flowing an atmosphere gas through the furnace; a thermal equilibrium is maintained at the temperature; and the catalyst precursor is dropped and heated in a crucible which is a heating zone in the furnace. The dropping method is preferable in terms of being able to minimizing the aggregation and growth of particles of the resultant electrode catalyst. When the catalyst precursor is in the form a solution, during this heating, the solvent is considered to be removed first.

Under the powder capturing method, the catalyst precursor in the form of a solid is caused to suspend as particles in a reducing atmosphere, or in an inert gas atmosphere containing a trace amount of an oxygen gas, and the catalyst precursor is captured and heated in a vertical tubular furnace kept at a predetermined heating temperature.

When the heat treatment is performed by the standing method, the heating rate, which is not particularly limited, is preferably about 1° C./min to 100° C./min, more preferably 5° C./min to 50° C./min. The heating time is preferably 0.1 to 10 hours, more preferably 0.5 to 5 hours, still more preferably 0.5 to 3 hours. When the heating by the standing method is performed in a tubular furnace, the heating time of the catalyst precursor is 0.1 to 10 hours, preferably 0.5 to 5 hours. The heating time in this range tends to lead to the formation of uniform electrode catalyst particles.

Under the stirring method, the heating time of the catalyst precursor is usually 10 minutes to 5 hours, preferably 30 minutes to 2 hours. Under this method, when the catalyst precursor is continuously heated, for example, by using a gradient furnace, the heating time is defined as an average retention time as calculated from the sample flowing amount in a constant furnace.

Under the dropping method, the heating time of the catalyst precursor is usually 0.5 to 10 minutes, preferably 0.5 to 3 minutes. The heating time in this range tends to lead to the formation of uniform electrode catalyst particles.

Under the powder capturing method, the heating time of the catalyst precursor is 0.2 second to 1 minute, preferably 0.2 to 10 seconds. The heating time in this range tends to lead to the formation of uniform electrode catalyst particles.

When the heat treatment is performed under the standing method, a heating furnace employing LNG (liquefied natural gas), LPG (liquefied petroleum gas), light oil, heavy oil, electricity or the like as a heat source may be used as a heat treatment apparatus. In this case, since the atmosphere in heat-treating the catalyst precursor is important in the present invention, a preferable apparatus is not a heating apparatus that holds fuel flame within the furnace and thereby provides heating from the inside of the furnace, but a heating apparatus that provides heating from the outside of the furnace.

When a heating furnace, which provides the catalyst precursor in a solid content of 50 kg or more per one batch, is used, a heating furnace employing LNG or LPG as a heat source is preferable in terms of cost.

When an electrode catalyst having particularly high catalytic activity is desired, it is preferable to use an electric furnace employing electricity as a heat source, which allows for the strict controlling of temperature.

Exemplary shapes of the furnace include a tubular furnace, a top-loading furnace, a tunnel furnace, a box furnace, a sample table elevating-type furnace (elevator furnace) and a car-bottom furnace. Of these, preferred are a tubular furnace, atop-loading furnace, a box furnace and a sample table elevating-type furnace; more preferable are a tubular furnace and a box furnace, which allow for the strict controlling of atmosphere.

When the stirring method is adopted, the above heat source is employable. However, especially when the catalyst precursor is continuously heat-treated by the stirring method using a gradient rotary kiln, it is likely that the equipment size becomes larger and a large amount of energy is needed; and thus it is preferable to use a heat source derived from fuels such as LPG.

The atmosphere in performing the heat treatment is preferably atmosphere containing an inert gas as a main component, which allows the resultant electrode catalyst to have increased activity. Among the inert gases, in view of relatively low cost and easy availability, argon and helium are preferable; and argon is more preferable. These inert gases may be used singly, or two or more kinds may be used in combination.

The presence of a reactive gas in the atmosphere in performing the heat treatment may allow the resultant electrode catalyst to have higher catalytic performance. For example, when the heat treatment is performed under the atmosphere of a mixed gas of a nitrogen gas, an argon gas, a mixed gas of a nitrogen gas and an argon gas, or at least one gas selected from a nitrogen gas and an argon gas and at least one gas selected from a hydrogen gas, an ammonia gas and an oxygen gas, an electrode catalyst having high catalytic performance tends to be obtained.

When the atmosphere in performing the heat treatment contains a hydrogen gas, the concentration of the hydrogen gas is, for example, 100% by volume or lower, preferably 0.01 to 10% by volume, more preferably 1 to 5% by volume.

When the atmosphere in performing the heat treatment contains an oxygen gas, the concentration of the oxygen gas is, for example, 0.01 to 10% by volume, more preferably 0.01 to 5% by volume.

The pressure in the heat treatment is not particularly limited, and the heat treatment may be performed under atmospheric pressure in view of production stability and cost.

The heat treatment may be followed by crushing of a heat-treated product. Performing the crushing operation can improve the processability in using the resultant electrode catalyst to produce an electrode, and properties of the resultant electrode. For the crushing, for example, a roll-rotating mill, a ball mill, a small-diameter ball mill (bead mill), a medium-stirring mill, an air flow crusher, a mortar, an automatic kneading mortar, a crushing tank or a jet mill may be used. When the electrode catalyst has been provided in a small amount, a mortar, an automatic kneading mortar, a batch-type ball mill is preferable. When the heat-treated product is to be continuously treated in a large amount, a jet mill or a continuous ball mill is preferable. Among the continuous ball mills, a bead mill is more preferable.

Heat-Treated Product

The heat-treated product of the present invention is obtained through:

a step (I) of obtaining a catalyst precursor, comprising a step (Ia) of mixing at least the metal compound (1), the nitrogen-containing organic compound (2), the fluorine-containing compound (3), and a step (II) of heat-treating the catalyst precursor at a temperature of 500 to 1300° C. to obtain an electrode catalyst, a portion or the entirety of the metal compound (1) being a compound containing an atom of a metal element M1 selected from the group consisting of iron, cobalt, chromium, nickel, copper, zinc, titanium, niobium and zirconium, and at least one of the compounds (1), (2) and (3) containing an oxygen atom.

The details of the steps (I) and (II) and the compounds (1) to (3) are as mentioned above.

The heat-treated product of the present invention is useful as a fuel cell electrode catalyst described below.

Fuel Cell Electrode Catalyst

The fuel cell electrode catalyst of the present invention (hereinafter also simply referred to as the "catalyst") is produced by the above-mentioned process for producing a fuel cell electrode catalyst of the present invention. Also, the catalyst of the present invention may comprise the above-mentioned heat-treated product of the present invention.

When the proportion of the atomic numbers of the metal element, carbon, nitrogen, oxygen and fluorine that constitute the catalyst is represented by metal element:carbon:nitrogen:oxygen:fluorine=1:x:y:z:f, the following is preferably satisfied: $0<x\leq9$, $0<y\leq2$, $0<z\leq5$ and $0<f\leq2$.

According to the process for producing a fuel cell electrode catalyst of the present invention, a fuel cell electrode catalyst having a large specific surface area is produced. The specific surface area as calculated by BET method of the catalyst of the present invention is preferably 30 to 1000 $m^2/g$, more preferably 30 to 350 $m^2/g$, still more preferably 50 to 300 $m^2/g$, particularly preferably 100 to 300 $m^2/g$.

The catalyst (A) has an oxygen reduction onset potential as measured in accordance with the measurement method (A) described below, of 0.75 V (vs. RHE) or more, more preferably 0.80 V (vs. RHE) or more, further preferably 0.85 V or more, as measured versus a reversible hydrogen electrode.

[Measurement Method (A):

The catalyst and carbon are added into a solvent so that the catalyst dispersed in the carbon serving as an electron conductive material accounts for 1% by mass. The mixture is ultrasonically stirred to give a suspension. The carbon source herein is carbon black (specific surface area: 100-300 $m^2/g$) (e.g., VULCAN (registered trademark) XC-72 manufactured by Cabot Corporation), and the catalyst is dispersed therein with a catalyst:carbon mass ratio of 95:5. The solvent is a mixture of isopropyl alcohol:water (mass ratio)=2:1.

While ultrasonicating the suspension, a 30 μL portion thereof is collected and is quickly dropped on a glassy carbon electrode (diameter: 6 mm) and dried at 120° C. for 5 minutes to form a fuel cell catalyst layer containing the catalyst on the glassy carbon electrode. This dropping and drying operation is performed until 1.0 mg or more of the fuel cell catalyst layer is formed on the carbon electrode surface.

Subsequently, 10 µL of a 5% NAFION (registered trademark) solution (DE521, DuPont) diluted ten times with isopropyl alcohol is further dropped on the fuel cell catalyst layer and is dried at 120° C. for 1 hour.

The electrode manufactured above is polarized in an aqueous 0.5 mol/L sulfuric acid solution at 30° C. under an oxygen atmosphere and under a nitrogen atmosphere at a potential scanning rate of 5 mV/sec, thereby recording a current-potential curve. As a reference, a reversible hydrogen electrode in an aqueous sulfuric acid solution of the same concentration is used. In the current-potential curve, the potential at which the reduction current starts to differ by 0.2 µA/cm$^2$ or more between the reduction current under the oxygen atmosphere and the reduction current under the nitrogen atmosphere is defined as the oxygen reduction onset potential.]

In the present invention, the oxygen reduction current density can be determined in such a manner as described below.

At first, from the result of the measurement method (A), a difference between the reduction current under the oxygen atmosphere and the reduction current under the nitrogen atmosphere at a specific potential (e.g., 0.80 V (vs. RHE)) is calculated. The calculated value is divided by an area of the electrode to provide a value and this value is defined as an oxygen reduction current density (mA/cm$^2$).

Uses

The catalyst of the present invention can be used as a catalyst alternative to platinum catalysts.

The fuel cell catalyst layer of the present invention comprises the catalyst.

Fuel cell catalyst layers include anode catalyst layers and cathode catalyst layers, and the catalyst may be used in any one of these layers. Because the catalyst has excellent durability and high oxygen reducing ability, it is preferably used in cathode catalyst layers.

The fuel cell catalyst layer of the present invention preferably further comprises an electron conductive powder. When the fuel cell catalyst layer comprising the catalyst further comprises the electron conductive powder, the reduction current can be more increased. It is considered that the electron conductive powder increases the reduction current because of allowing the catalyst to have an electrical bond for inducing electrochemical reaction.

The electron conductive particles are usually used as a carrier of the catalyst.

The catalyst has conductivity to some degree, but in order for the catalyst to be given more electrons or in order for a reactant to receive many electrons from the catalyst, the catalyst, in order to be provided with conductivity, may be mixed with carrier particles. The carrier particles may be added to the catalyst produced after subjected to the step (I) to the step (II), or may be added at any stage of from the step (I) to the step (II).

Examples of materials of the electron conductive particles include carbon, conductive polymers, conductive ceramics, metals and conductive inorganic oxides such as tungsten oxide and iridium oxide. These materials can be used singly or in combination with one another. In particular, the electron conductive particles composed of carbon have a large specific surface area, and moreover those having a small particle diameter are easily available inexpensively. Furthermore, they are excellent in chemical resistance and high-potential resistance. Thus, preferred is carbon or a mixture of carbon and other electron conductive particles. That is, the fuel cell catalyst layer according to a preferred embodiment comprises the catalyst and carbon.

Examples of the carbon include carbon black, graphite, activated carbon, carbon nanotube, carbon nanofiber, carbon nanohorn, fullerene, porous carbon and graphene. If the particle diameter of the electron conductive particles composed of carbon is excessively small, an electron conductive path is not readily formed. If the particle diameter is excessively large, the fuel cell catalyst layer tends to have decreased gas diffusion properties, or the catalyst usage rate tends to be lowered. Therefore, the particle diameter of the electron conductive particles composed of carbon is preferably in the range of 10 to 1000 nm, and more preferably 10 to 100 nm.

When the electron conductive particles are composed of carbon, the mass ratio of the catalyst to the electron conductive particles (catalyst:electron conductive particles) is preferably 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The fuel cell catalyst layer according to a preferred embodiment further comprises a polymer electrolyte. The polymer electrolytes are not particularly limited as long as being those commonly used in fuel cell catalyst layers. Specific examples thereof include perfluorocarbon polymers having a sulfonic acid group (such as NAFION (registered trade mark), hydrocarbon polymer compounds having a sulfonic acid group, polymer compounds doped with inorganic acids such as a phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trade mark) is preferable. An example of the source of NAFION (registered trade mark) in forming the fuel cell catalyst layer is a 5% NAFION (registered trade mark) solution (DE521, DuPont).

The fuel cell catalyst layer of the present invention may be used as an anode catalyst layer or a cathode catalyst layer. The fuel cell catalyst layer of the present invention comprises the catalyst that has high oxygen reducing activity and is resistant to corrosion in acidic electrolytes even at high potential. Accordingly, the catalyst layer of the present invention is suited for use as a catalyst layer provided in a cathode of a fuel cell (as a cathode catalyst layer). In particular, the catalyst layer is suitably provided in a cathode of a membrane electrode assembly in a polymer electrolyte fuel cell.

The catalyst may be dispersed on the electron conductive particles serving as a carrier by methods such as airborne dispersion methods and in-liquid dispersion methods. The in-liquid dispersion methods are preferable because a dispersion of the catalyst and the electron conductive particles in a solvent can be used in the step for forming a fuel cell catalyst layer. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents, water or the like are generally used.

When the catalyst is dispersed on the electron conductive particles, the electrolyte and a dispersing agent may be further dispersed at the same time.

The fuel cell catalyst layer may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the catalyst, the electron conductive particles and the electrolyte may be applied or filtered on a substrate to form a fuel cell catalyst layer, and the catalyst layer may be transferred to an electrolyte membrane.

The electrode of the present invention comprises the fuel cell catalyst layer and a porous support layer.

The electrode of the present invention may be used as a cathode or an anode. The electrode of the present invention has excellent durability and high catalytic performance, and thus is suitably used as a cathode, leading to higher industrial advantage.

The porous support layer is a layer which diffuses gas (hereinafter, also referred to as the "gas diffusion layer"). The gas diffusion layer is not particularly limited as long as having electron conductivity, high gas diffusion properties and high corrosion resistance. Carbon-based porous materials such as carbon paper and carbon cloth, and stainless steel and anticorrosive-coated aluminum foils for weight reduction are generally used.

The membrane electrode assembly of the present invention comprises a cathode, an anode and an electrolyte membrane interposed between the cathode and the anode, wherein the cathode and/or the anode are the electrodes as described above.

The catalytic performance in the membrane electrode assembly can be evaluated, for example, by a maximum power density calculated as described below.

First, the membrane electrode assembly 11 is held by sealing materials (gaskets 12), separators each having a gas flow passage 13, and collectors 14 and fixed with a bolt, and secured so that the pressure of contacted surface becomes a prescribed value (4 N), to thereby prepare a single cell of a polymer electrolyte fuel cell.

To the anode side, hydrogen is supplied as a fuel at a flow rate of 1 L/min, and to the cathode side, oxygen is supplied as an oxidizing agent at a flow rate of 2 L/min, and, while applying a back pressure of 300 kPa to both sides, a current-voltage property at a temperature of the single cell of 90° C. is measured. From the current-voltage property curve obtained, a maximum power density is calculated. The higher the maximum power density is, the higher the catalytic performance in the membrane electrode assembly is. The maximum power density is preferably 400 mW/cm$^2$ or more, more preferably 600 mW/cm$^2$ or more, and the upper limit thereof is, e.g., around 1000 mW/cm$^2$.

As the electrolyte membranes, perfluorosulfonic acid-based electrolyte membranes or hydrocarbon electrolyte membranes are generally used, and there may also be used membranes in which polymer microporous membranes are impregnated with liquid electrolyte; membranes in which porous bodies are filled with polymer electrolyte; or the like.

The fuel cell of the present invention comprises the membrane electrode assembly as described above.

The electrode reaction in fuel cells takes place at a so-called three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assembly of the present invention is preferably used in polymer electrolyte fuel cells.

The fuel cell comprising the catalyst of the present invention has high performance and is considerably inexpensive as compared with platinum catalysts. The use of the fuel cell of the present invention can improve performance of an article, particularly a mobile particle, having a fuel cell and equipped with a function selected from the group consisting of electricity generating function, light emitting function, heat generating function, sound generating function, movement function, display function and charging function. The fuel cell is held preferably on a surface or an inside of the article.

<Specific Examples of Articles Comprising Fuel Cell of Present Invention>

Specific examples of articles comprising the fuel cell of the present invention include architectural structures such as buildings, houses and tents, illumination equipment such as fluorescent light, LED, organic EL, street light, interior illumination and traffic light, machinery, automotive devices including vehicles, household appliances, agricultural equipment, electronic devices, mobile information terminals including mobile phones, beauty instruments, portable tools, sanitary goods such as bathroom goods, furniture, toys, ornaments, bulletin boards, cool boxes, outdoor goods such as exterior electricity generators, teaching materials, artificial flowers, items of artwork, power source for cardiac pacemakers and power source for heating and cooling equipped with Peltier devices.

EXAMPLES

The present invention will be described based on examples hereinbelow without limiting the scope of the present invention.

In Examples and Comparative Examples, measurements were performed by the following methods.

[Analytical Methods]

1. Powder X-ray Diffractometry

Samples were subjected to powder X-ray diffractometry using Rotaflex manufactured by Rigaku Corporation.

The details of the measurement conditions are as follows.

X-ray output: (Cu-Kα): 50 kV, 180 mA
Scanning axis: θ/2θ
Measurement range (2θ): 10.00° to 89.98°
Measurement mode: FT
Reading width: 0.02°
Sampling time: 0.70 sec
DS, SS, RS: 0.5°, 0.5°, 0.15 mm
Goniometer radius: 185 mm With regard to the counting of diffraction peaks in the powder X-ray diffractometry for each sample, a signal that was detected with a signal (S) to noise (N) ratio (S/N) of 2 or more was regarded as a single peak.

The noise (N) was the width of the baseline.

2. Elemental Analysis

<Carbon>

About 0.01 g of a sample was weighed and measured with a carbon/sulfur analyzer (EMIA-920V manufactured by HORIBA, Ltd.).

<Nitrogen and Oxygen>

About 0.01 g of a sample was weighed, sealed in a Ni capsule, and was measured with an oxygen/nitrogen analyzer (TC600 manufactured by LECO).

<Metal>

About 0.1 g of a sample was weighed in a quartz beaker, and the sample was completely decomposed by heating, using a sulfuric acid, a nitric acid, and a fluorinated acid. After cooling, this solution was collected to a constant volume of 100 ml, and further appropriately diluted, and was quantitated by using ICP-OES (VISTA-PRO manufactured by SII) or ICP-MS (HP7500 manufactured by Agilent).

<Fluorine>

Several mg of a sample was decomposed by combustion while flowing water vapor under oxygen stream. A generated gas was made to be absorbed by 10 mM $Na_2CO_3$ (containing hydrogen peroxide; standard for correction Br—: 5 ppm) to measure the amount of fluorine by ion chromatography.

Combustion Decomposition Conditions:
  Sample combustion apparatus: AQF-100 (manufactured by Mitsubishi Chemical Analytech Co., Ltd.)
  Combustion tube temperature: 950° C. (temperature-raising decomposition by moving a sample board)
  Ion Chromatography Measurement Conditions
  Measuring apparatus: DIONEX DX-500
  Eluent: 1.8 mM $Na_2CO_3$+1.7 mM $NaHCO_3$
  Column (temperature): ShodexSI-90 (room temperature)
  Flow rate: 1.0 ml/min
  Injection amount: 25 µl
  Detector: Electric conductivity detector
  Suppressor: DIONEX ASRS-300

3. BET Specific Surface Area Measurement

ABET specific surface area was measured using Micromeritics Gemini 2360 manufactured by Shimadzu Corporation. The pretreatment time and the pretreatment temperature were set at 30 minutes and 200° C., respectively.

4. Evaluation of Oxygen Reducing Activity (1) Production of Fuel Cell Electrode

Each of the catalysts obtained in Examples and Comparative Examples in an amount of 95 mg and carbon (VULCAN (registered trademark) XC-72 manufactured by Cabot Corporation) in an amount of 5 mg were added to 10 g of a solution obtained by mixing isopropyl alcohol and pure water at a mass ratio between isopropyl alcohol and pure water of 2:1 (isopropyl alcohol: pure water). The mixture was ultrasonically stirred to give a suspended mixture. 30 µl of this mixture was applied on a glassy carbon electrode (diameter: 6 mm, manufactured by Tokai Carbon Co., Ltd.) and was dried at 120° C. for 5 minutes, thereby forming 1.0 mg or more of a fuel cell catalyst layer on the carbon electrode surface. Subsequently, 10 µl of a 5% NAFION (registered trade name) solution (DE521, manufactured by DuPont) diluted ten times with isopropyl alcohol was applied thereon and was dried at 120° C. for 1 hour. A fuel cell electrode was thus obtained.

(2) Evaluation of Oxygen Reducing Activity

The fuel cell electrode prepared was polarized in an aqueous 0.5 mol/L sulfuric acid solution at 30° C. under an oxygen atmosphere and under a nitrogen atmosphere at a potential scanning rate of 5 mV/sec, thereby measuring a current-potential curve. As a reference electrode, a reversible hydrogen electrode was used in an aqueous sulfuric acid solution of the same concentration.

From the result of the above measurement, the potential at which the reduction current started to differ by 0.2 µA/cm² or more between the reduction current under the oxygen atmosphere and the reduction current under the nitrogen atmosphere was defined as an oxygen reduction onset potential. Further, differences between the reduction current under the oxygen atmosphere and the reduction current under the nitrogen atmosphere at 0.75 V and 0.80 V (vs. RHE) were calculated. The calculated value was divided by an area of the electrode to provide a value and this value was defined as an oxygen reduction current density (mA/cm²).

From the oxygen reduction onset potential and the oxygen reduction current density, the catalytic performance of the fuel cell electrode prepared was evaluated.

The higher the oxygen reduction onset potential and the higher the oxygen reduction current density are, the higher the catalytic performance of the catalyst in the fuel cell electrode is.

Example 1

In a beaker, 2.60 g (25.9 mmol) of acetylacetone was put. While stirring this, 5.00 ml (17.6 mmol) of titanium isopropoxide was added, and 16 ml of acetic acid was further dropwise added over 2 minutes, to prepare a titanium solution (1).

In a 200 ml beaker having a stirring bar (length: 30 mm), 60 ml of water, 50 ml of ethanol, and 60 ml of acetic acid were put. 8.74 g (70.4 mmol) of pyrazinecarboxylic acid was added thereto and completely dissolved by the application of ultrasonic wave using an ultrasonic washer. To the resultant solution, while this was stirred, 0.100 ml of SURFLON S-211 (manufactured by AGC SEIMI CHEMICAL CO., LTD., perfluoroalkyl carboxylic acid salt content: 50% by mass) was added, and 290 mg (1.67 mmol) of iron(II) acetate was added little by little, and these were completely dissolved over about 10 minutes. Then, with the temperature kept at room temperature and stirring, the titanium solution (1) was dropwise added over 10 minutes. The dropwise addition was followed by stirring for 30 minutes to obtain a catalyst precursor (1) in the form of a solution.

The catalyst precursor (1) was heated and stirred with a rotary evaporator under reduced pressure in a nitrogen atmosphere with the temperature of a hot stirrer set at about 100° C., and thereby the solvent was slowly evaporated. The solvent was completely evaporated and the resultant solid residue was crushed with an automatic mortar to obtain 10.7 g of a powder (1) for calcining.

While flowing, into a rotary kiln furnace, a nitrogen gas containing 4% by volume of a hydrogen gas (i.e., a mixed gas of hydrogen gas: nitrogen gas=4% by volume: 96% by volume), at a rate of 20 mL/min, 1.20 g of the powder (1) for calcining was heated to 890° C. at a temperature increase rate of 10° C./min and calcined at 890° C. for 0.5 hour, and was left standing to cool, to obtain 216 mg of a powdery catalyst (1).

Figure 2:
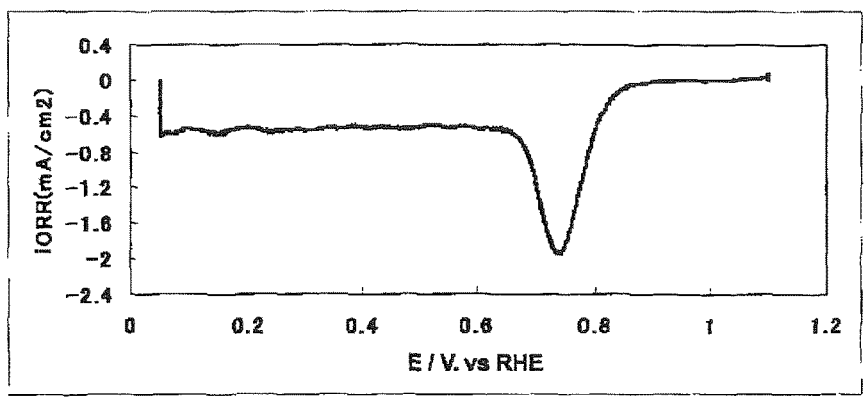
FIG. 2 is an oxygen reduction current density-potential curve of a fuel cell electrode (1) of Example 1.

The evaluation results of the catalyst (1) are shown in Table 1, FIG. 1 (powder X-ray diffraction spectrum of the catalyst (1)) and FIG. 2 (measurement result of the oxygen reducing ability of a fuel cell electrode (1) using the catalyst (1)).

Example 2

The same procedure was performed as in Example 1, except that the amount of SURFLON S-211 was changed from 0.100 ml to 0.500 ml, to obtain 224 mg of a powdery catalyst (2). The mass of the powder for calcining obtained in this process was 10.7 g.

Figure 3:
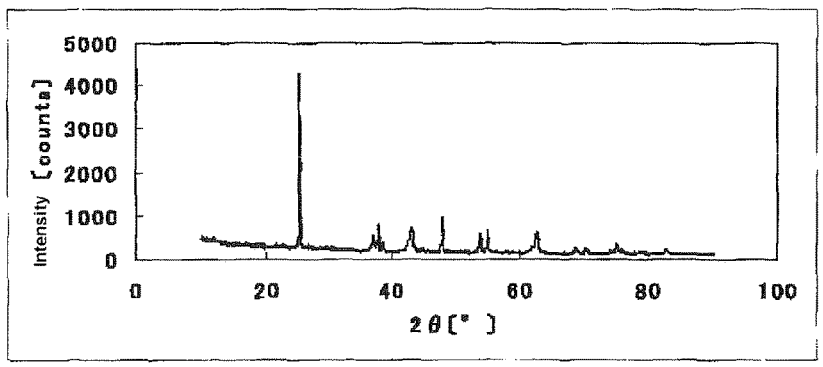
FIG. 3 is a powder X-ray diffraction spectrum of a catalyst (2) of Example 2.
Figure 4:
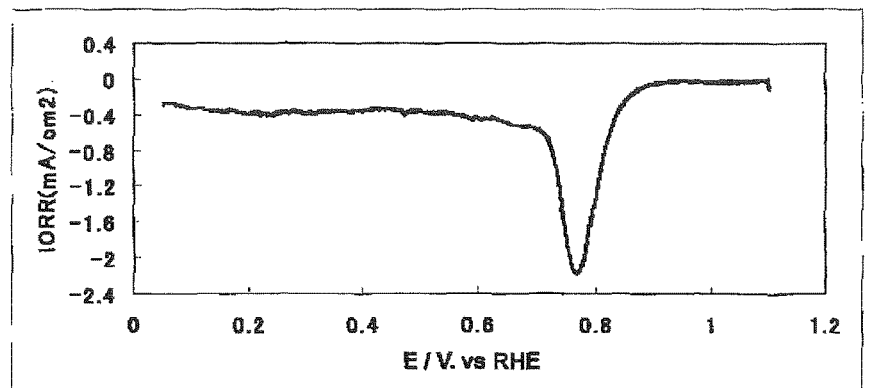
FIG. 4 is an oxygen reduction current density-potential curve of a fuel cell electrode (2) of Example 2.

The evaluation results of the catalyst (2) are shown in Table 1, FIG. 3 (powder X-ray diffraction spectrum of the catalyst (2)) and FIG. 4 (measurement result of the oxygen reducing ability of a fuel cell electrode (2) using the catalyst (2)).

Example 3

The same procedure was performed as in Example 1, except that the amount of SURFLON S-211 was changed from 0.100 ml to 1.00 ml, to obtain 203 mg of a powdery catalyst (3). The mass of the powder for calcining obtained in this process was 11.2 g.

Figure 5:
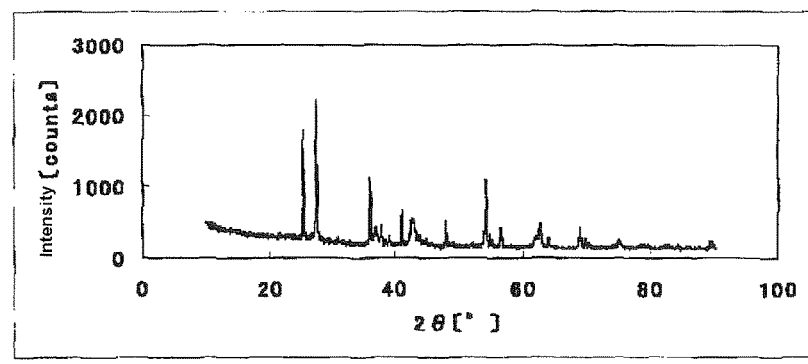
FIG. 5 is a powder X-ray diffraction spectrum of a catalyst (3) of Example 3.
Figure 6:
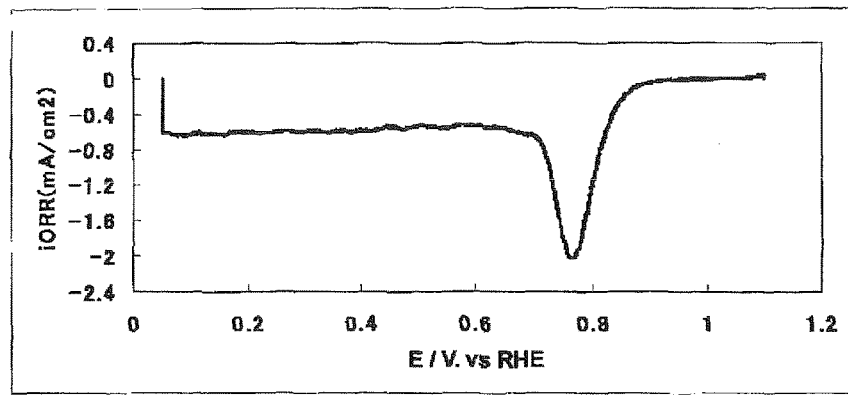
FIG. 6 is an oxygen reduction current density-potential curve of a fuel cell electrode (3) of Example 3.

The evaluation results of the catalyst (3) are shown in Table 1, FIG. 5 (powder X-ray diffraction spectrum of the catalyst (3)) and FIG. 6 (measurement result of the oxygen reducing ability of a fuel cell electrode (3) using the catalyst (3)).

Example 4

In a beaker, 2.60 g (25.9 mmol) of acetylacetone was put. While this was stirred, 5.00 ml (17.6 mmol) of titanium isopropoxide was put, and further 28 ml of acetic acid was dropwise adder over 2 minutes, to prepare a titanium solution (4).

The same procedure was performed as in Example 1, except that SURFLON S-211 in an amount of 0.1 ml was changed to ammonium pentadecafluorooctanoate in an amount of 759 mg (1.67 mmol), and the titanium solution (1) was replaced with the titanium solution (4), to obtain 216 mg of a powdery catalyst (4). The mass of the powder for calcining obtained in this process was 11.5 g.

Figure 7:
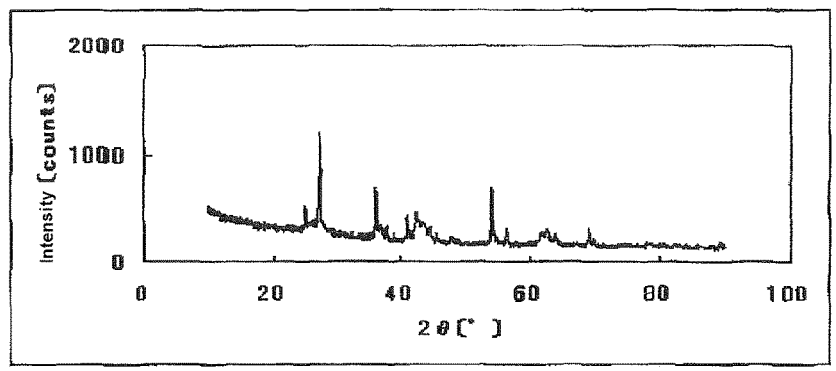
FIG. 7 is a powder X-ray diffraction spectrum of a catalyst (4) of Example 4.
Figure 8:
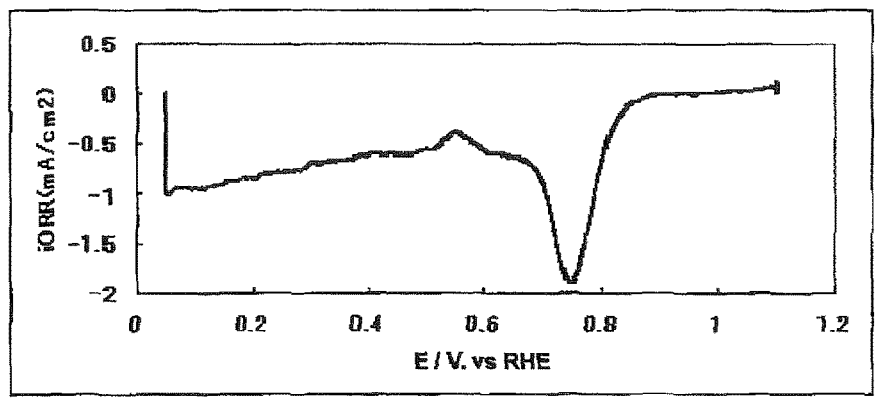
FIG. 8 is an oxygen reduction current density-potential curve of a fuel cell electrode (4) of Example 4.

The evaluation results of the catalyst (4) are shown in Table 1, FIG. 7 (powder X-ray diffraction spectrum of the catalyst (4)) and FIG. 8 (measurement result of the oxygen reducing ability of a fuel cell electrode (4) using the catalyst (4)).

Example 5

The same procedure was performed as in Example 1, except that SURFLON S-211 in an amount of 0.100 ml was replaced with SURFLON S-221(AGC SEIMI CHEMICAL CO., LTD., perfluoroalkyl trialkyl ammonium salt content: 30% by mass) in an amount of 1.00 ml, to obtain 227 mg of a powdery catalyst (5). The mass of the powder for calcining obtained in this process was 11.8 g.

Figure 9:
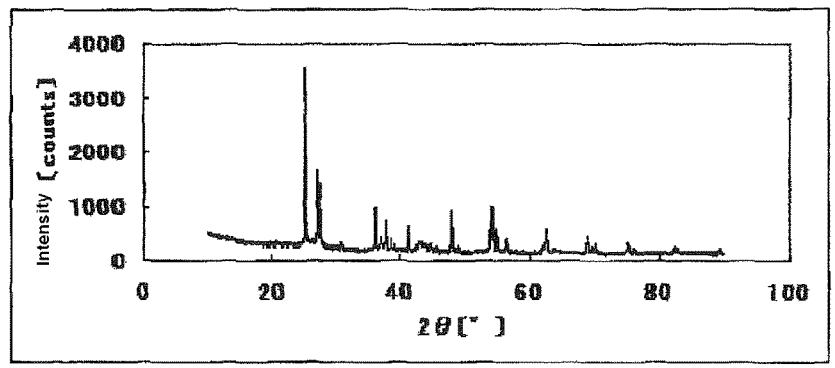
FIG. 9 is a powder X-ray diffraction spectrum of a catalyst (5) of Example 5.
Figure 10:
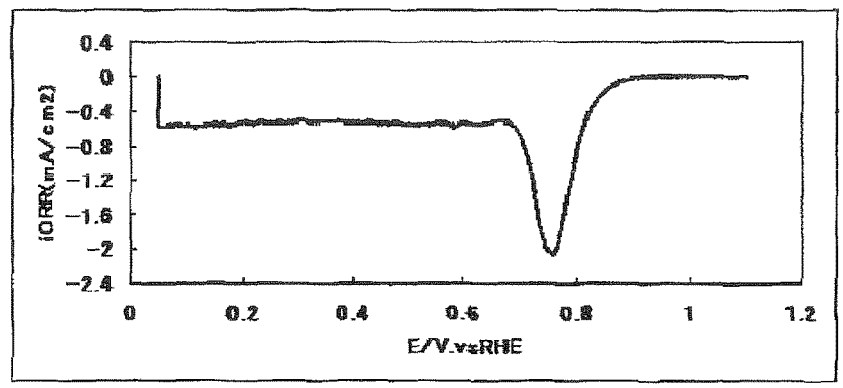
FIG. 10 is an oxygen reduction current density-potential curve of a fuel cell electrode (5) of Example 5.

The evaluation results of the catalyst (5) are shown in Table 1, FIG. 9 (powder X-ray diffraction spectrum of the catalyst (5)) and FIG. 10 (measurement result of the oxygen reducing ability of a fuel cell electrode (5) using the catalyst (5)).

Example 6

The same procedure was performed as in Example 1, except that SURFLON S-211 in an amount of 0.100 ml was replaced with SURFLON S-231 (AGC SEIMI CHEMICAL CO., LTD., perfluoroalkyl compound content: 30% by mass) in an amount of 0.83 ml, to obtain 233 mg of a powdery catalyst (6). The mass of the powder for calcining obtained in this process was 11.2 g.

Figure 11:
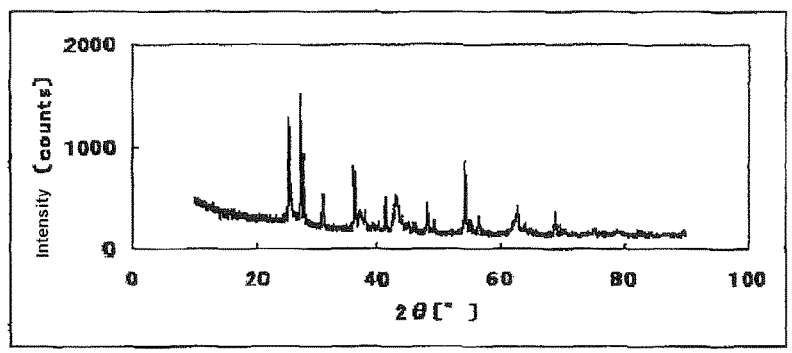
FIG. 11 is a powder X-ray diffraction spectrum of a catalyst (6) of Example 6.
Figure 12:
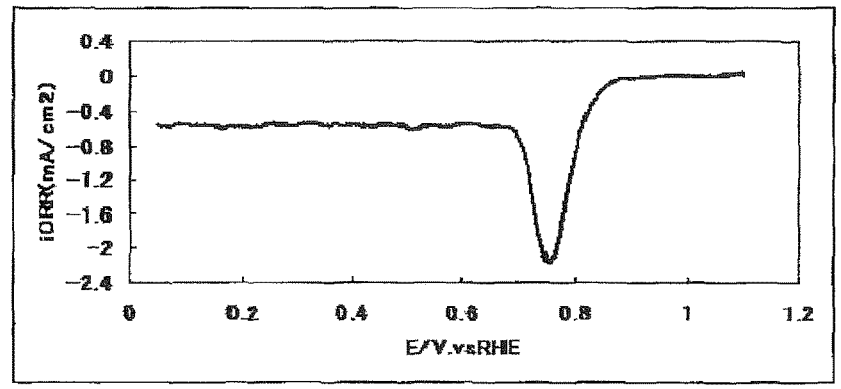
FIG. 12 is an oxygen reduction current density-potential curve of a fuel cell electrode (6) of Example 6.

The evaluation results of the catalyst (6) are shown in Table 1, FIG. 11 (powder X-ray diffraction spectrum of the catalyst (6)) and FIG. 12 (measurement result of the oxygen reducing ability of a fuel cell electrode (6) using the catalyst (6)).

Example 7

The same procedure was performed as in Example 1, except that SURFLON S-211 in an amount of 0.100 ml was replaced with SURFLON S-241(AGC SEIMI CHEMICAL CO., LTD., perfluoroalkyl amine oxide content: 30% by mass) in an amount of 0.83 ml, to obtain 241 mg of a powdery catalyst (7). The mass of the powder for calcining obtained in this process was 10.8 g.

Figure 13:
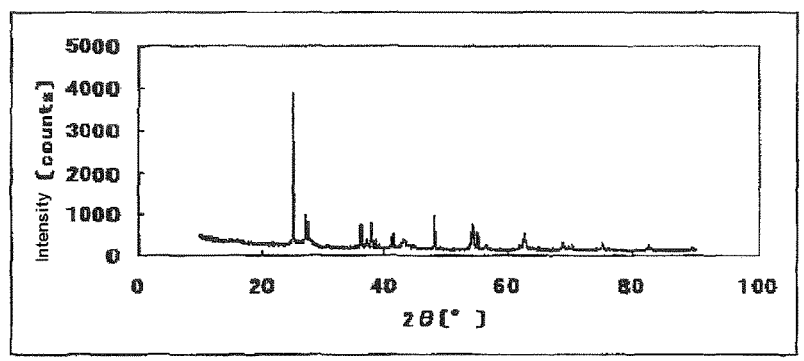
FIG. 13 is a powder X-ray diffraction spectrum of a catalyst (7) of Example 7.
Figure 14:
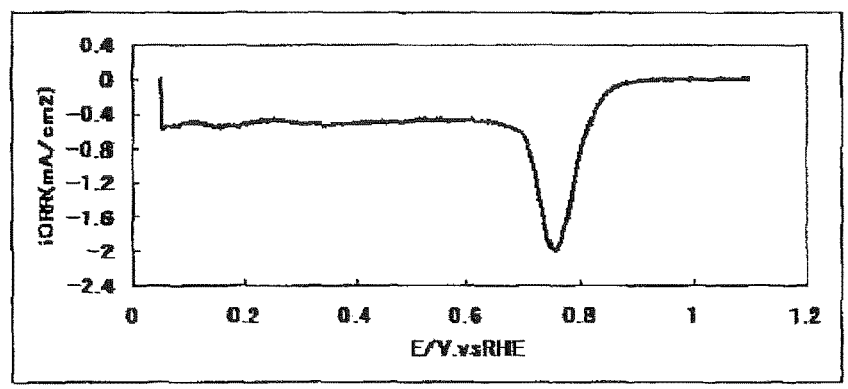
FIG. 14 is an oxygen reduction current density-potential curve of a fuel cell electrode (7) of Example 7.

The evaluation results of the catalyst (7) are shown in Table 1, FIG. 13 (powder X-ray diffraction spectrum of the catalyst (7)) and FIG. 14 (measurement result of the oxygen reducing ability of a fuel cell electrode (7) using the catalyst (7)).

Example 8

The same procedure was performed as in Example 1, except that SURFLON S-211 in an amount of 0.100 ml was replaced with SURFLON S-242 (AGC SEIMI CHEMICAL CO., LTD., perfluoroalkyl ethylene oxide adduct content: 100% by mass) in an amount of 250.4 mg, to obtain a 217 mg of a powdery catalyst (8). The mass of the powder for calcining obtained in this process was 10.9 g.

Figure 15:
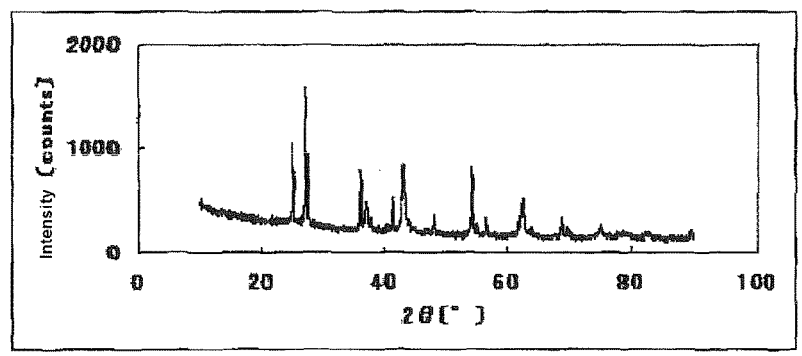
FIG. 15 is a powder X-ray diffraction spectrum of a catalyst (8) of Example 8.
Figure 16:
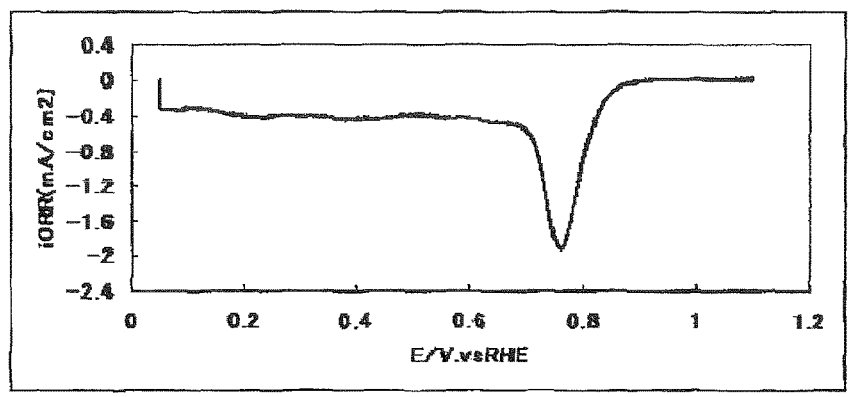
FIG. 16 is an oxygen reduction current density-potential curve of a fuel cell electrode (8) of Example 8.

The evaluation results of the catalyst (8) are shown in Table 1, FIG. 15 (powder X-ray diffraction spectrum of the catalyst (8)) and FIG. 16 (measurement result of the oxygen reducing ability of a fuel cell electrode (8) using the catalyst (8)).

Example 9

The same procedure was performed as in Example 1, except that SURFLON S-211 in an amount of 0.100 ml was replaced with SURFLON S-243(AGC SEIMI CHEMICAL CO., LTD., perfluoroalkyl ethylene oxide adduct content: 100% by mass) in an amount of 0.25 ml, to obtain 218 mg of a powdery catalyst (9). The mass of the powder for calcining obtained in this process was 11.2 g.

Figure 17:
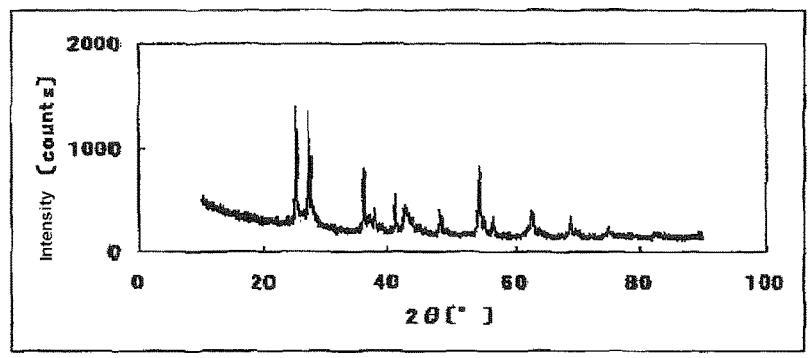
FIG. 17 is a powder X-ray diffraction spectrum of a catalyst (9) of Example 9.
Figure 18:
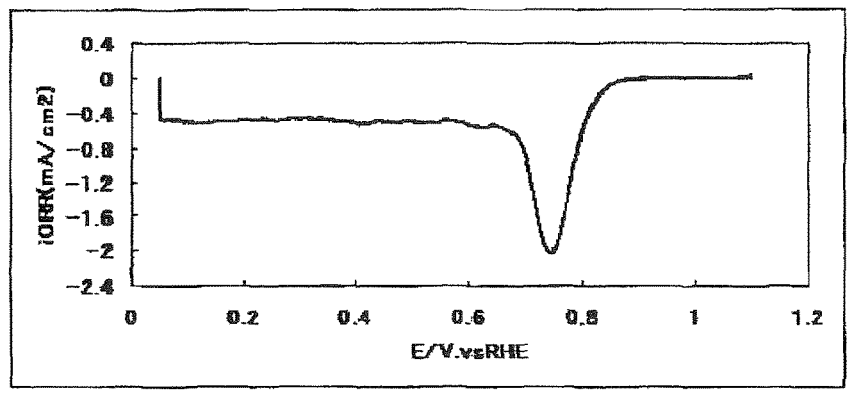
FIG. 18 is an oxygen reduction current density-potential curve of a fuel cell electrode (9) of Example 9.

The evaluation results of the catalyst (9) are shown in Table 1, FIG. 17 (powder X-ray diffraction spectrum of the catalyst (9)) and FIG. 18 (measurement result of the oxygen reducing ability of a fuel cell electrode (9) using the catalyst (9)).

Example 10

The same procedure was performed as in Example 1, except that SURFLON S-211 in an amount of 0.100 ml was replaced with SURFLON S-386 (AGC SEIMI CHEMICAL CO., LTD., perfluoroalkyl-containing oligomer content: 100% by mass) in an amount of 0.25 ml, to obtain 217 mg of a powdery catalyst (10). The mass of the powder for calcining obtained in this process was 10.8 g.

Figure 19:
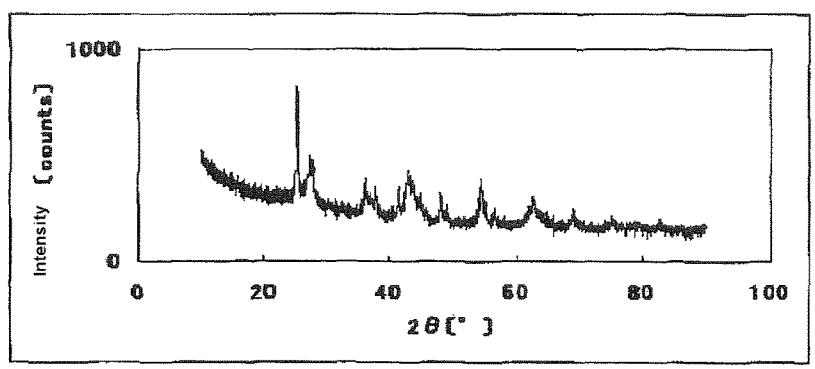
FIG. 19 is a powder X-ray diffraction spectrum of a catalyst (10) of Example 10.
Figure 20:
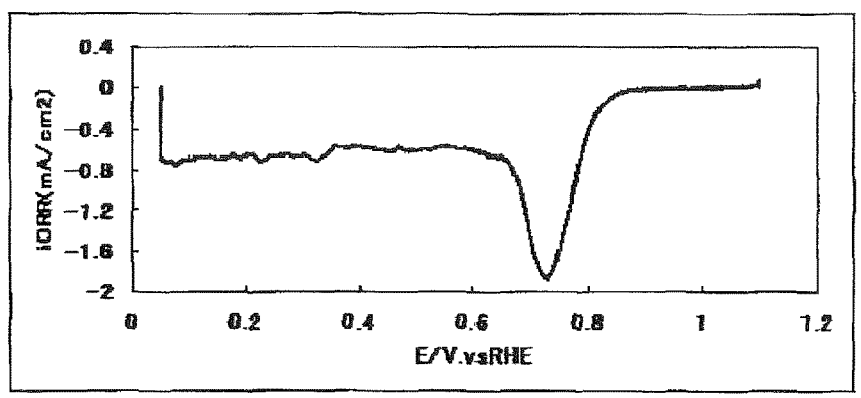
FIG. 20 is an oxygen reduction current density-potential curve of a fuel cell electrode (10) of Example 10.

The evaluation results of the catalyst (10) are shown in Table 1, FIG. 19 (powder X-ray diffraction spectrum of the catalyst (10)) and FIG. 20 (measurement result of the oxygen reducing ability of a fuel cell electrode (10) using the catalyst (10)).

Comparative Example 1

The same procedure was performed as in Example 1, except that SURFLON S-211 in an amount of 0.100 ml was replaced with octanoic acid in an amount of 253 mg, to obtain 215 mg of a powdery catalyst (c1). The mass of the powder for calcining obtained in this process was 11.0 g.

Figure 21:
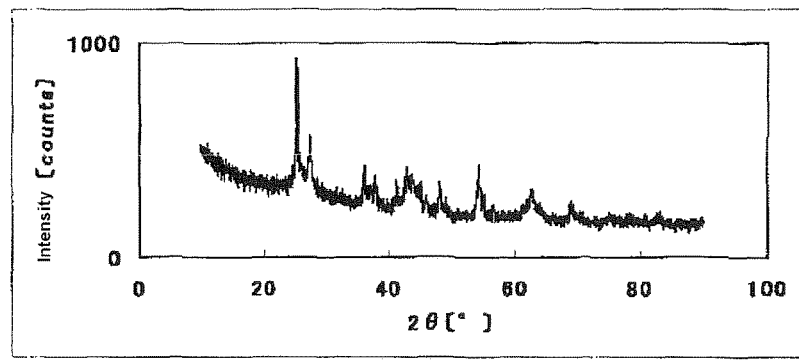
FIG. 21 is a powder X-ray diffraction spectrum of a catalyst (c1) of Comparative Example 1.
Figure 22:
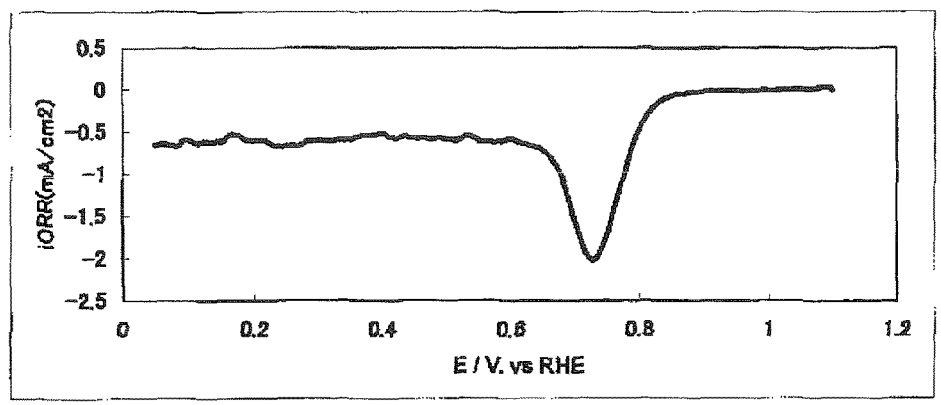
FIG. 22 is an oxygen reduction current density-potential curve of a fuel cell electrode (c1) of Comparative Example 1.

The evaluation results of the catalyst (c1) are shown in Table 2, FIG. 21 (powder X-ray diffraction spectrum of the catalyst (c1)) and FIG. 22 (measurement result of the oxygen reducing ability of a fuel cell electrode (c1) using the catalyst (c1)).

Comparative Example 2

To a mixed liquid of 15 mL of ethanol and 5 mL of acetic acid, 9.37 g of titanium tetraisopropoxide and 5.12 g of acetylacetone were added, and stirred at room temperature to prepare a titanium solution. Meanwhile, 8.30 g of ethylene glycol and 582 mg of iron(II) acetate were added to 20 mL of pure water, and stirred at room temperature and completely dissolved, to prepare an ethylene glycol solution. The titanium solution was slowly added to the ethylene glycol solution, to provide a catalyst precursor in the form of a transparent solution. The catalyst precursor was heated and stirred with a rotary evaporator under reduced pressure in a nitrogen atmosphere with the temperature of a hot stirrer set at about 100° C., and thereby the solvent was slowly evaporated. The solvent was completely evaporated and the resultant solid residue was finely and homogenously crushed with a mortar, to provide a powder for calcining.

This powder was introduced to a tubular furnace and heated to 890° C. at a temperature increase rate of 10° C./min under a nitrogen gas atmosphere containing 4% by volume of a hydrogen gas, and was held at 890° C. for 1 hour, and was left standing to cool, to provide a powdery catalyst (c2).

Figure 23:
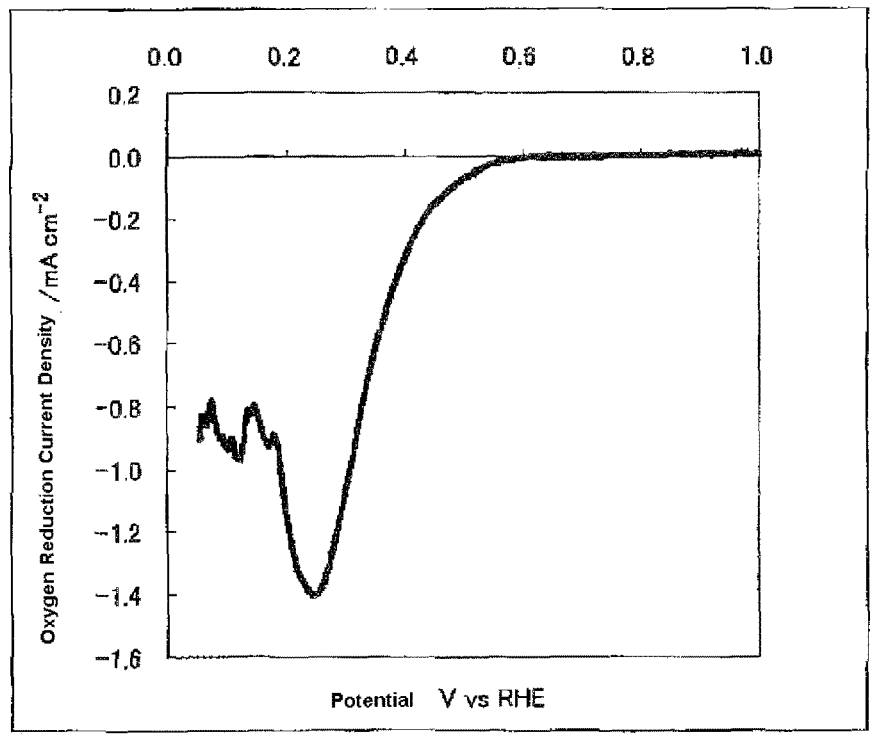
FIG. 23 is an oxygen reduction current density-potential curve of a fuel cell electrode (c2) of Comparative Example 2.

The evaluation results of the catalyst (c2) are shown in Table 2 and FIG. 23 (measurement result of the oxygen reducing ability of a fuel cell electrode (c2) using the catalyst (c2)).

Comparative Example 3

The same procedure was performed as in Comparative Example 2, except that ethylene glycol was replaced with 12.05 g of oxalic acid, to obtain a powdery catalyst (c3).

Figure 24:
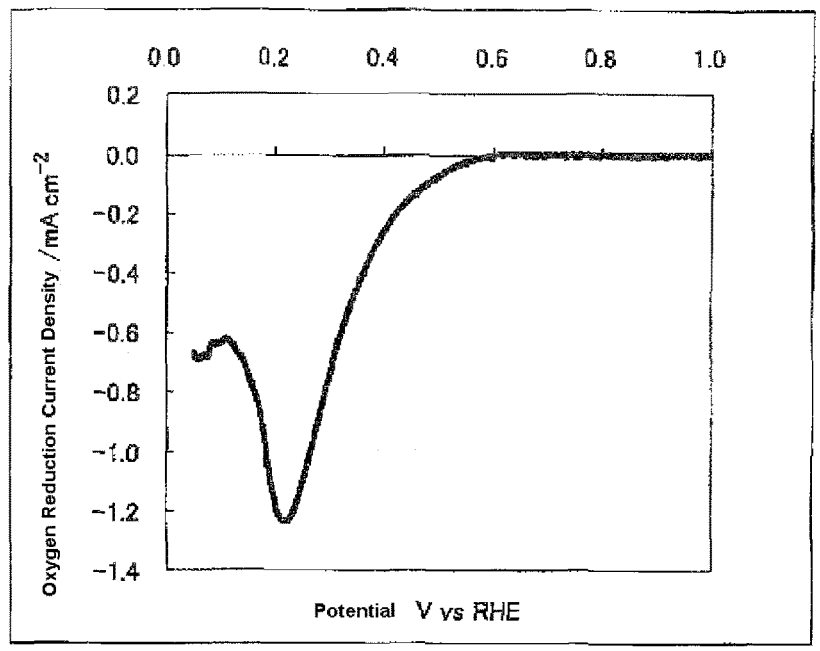
FIG. 24 is an oxygen reduction current density-potential curve of a fuel cell electrode (c3) of Comparative Example 3.

The evaluation results of the catalyst (c3) are shown in Table 2, and FIG. 24 (measurement result of the oxygen reducing ability of a fuel cell electrode (c3) using the catalyst (c3)).

Comparative Example 4

The same procedure was performed as in Comparative Example 2, except that ethylene glycol was replaced with 10.18 g of glycolic acid, to obtain a powdery catalyst (c4).

Figure 25:
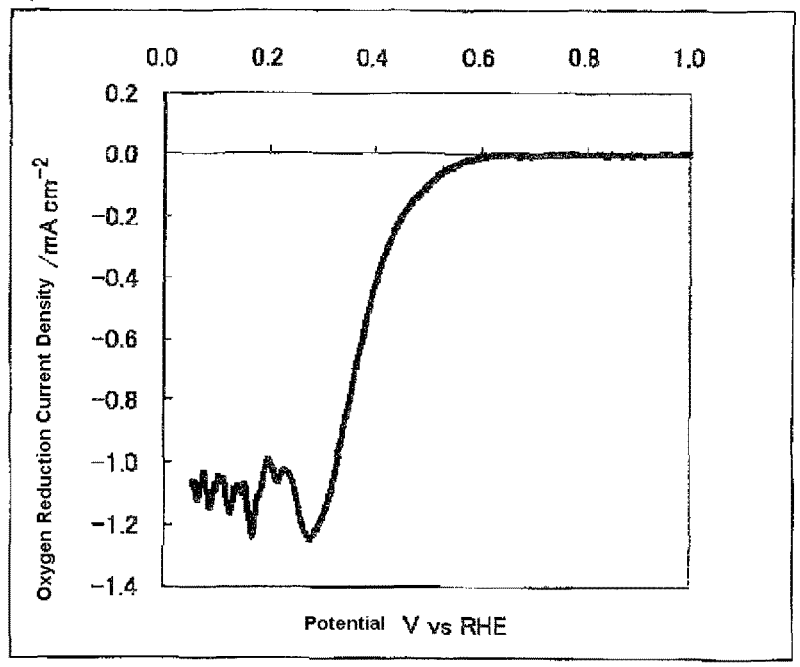
FIG. 25 is an oxygen reduction current density-potential curve of a fuel cell electrode (c4) of Comparative Example 4.

The evaluation results of the catalyst (c4) are shown in Table 2, and FIG. 25 (measurement result of the oxygen reducing ability of a fuel cell electrode (c4) using the catalyst (c4)).

Comparative Example 5

Titanium oxide (anatase type, 100 m²/g) was introduced to a tubular furnace and heated to 900° C. at a temperature increase rate of 10° C./min under a nitrogen atmosphere containing 4% by volume of a hydrogen gas, and was held at 900° C. for 1 hour and left standing to cool, to provide a powdery catalyst (c5).

Figure 26:
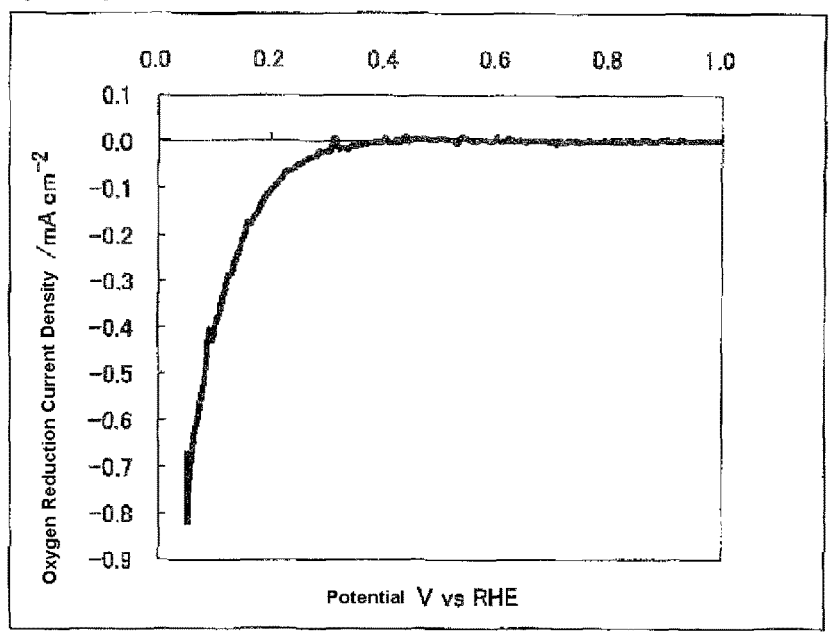
FIG. 26 is an oxygen reduction current density-potential curve of a fuel cell electrode (c5) of Comparative Example 5.

The evaluation results of the catalyst (c5) are shown in Table 2, and FIG. 26 (measurement result of the oxygen reducing ability of a fuel cell electrode (c5) using the catalyst (c5)).

Comparative Example 6

In a mortar, 2 g of titanium oxide (anatase type, 100 m²/g) was thoroughly mixed with 0.75 g of carbon black (VULCAN (registered trademark) XC72, manufactured by Cabot Corporation). The mixture was introduced to a tubular furnace and heated to 1700° C. at a temperature increase rate of 10° C./min under a nitrogen atmosphere containing 4% by volume of a hydrogen gas, and was held at 1700° C. for 3 hours and left standing to cool, to provide a powdery catalyst (c6).

Figure 27:
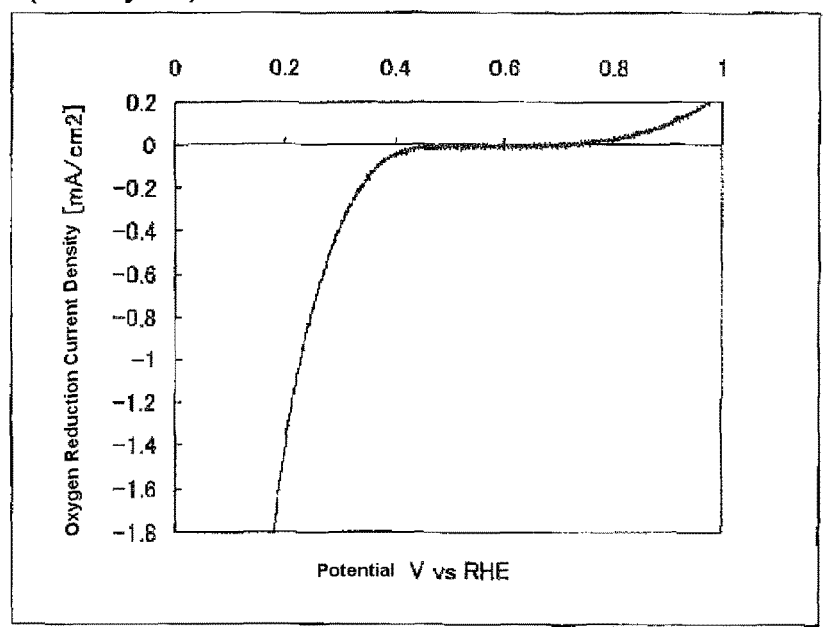
FIG. 27 is an oxygen reduction current density-potential curve of a fuel cell electrode (c6) of Comparative Example 6.

The evaluation results of the catalyst (c6) are shown in Table 2, and FIG. 27 (measurement result of the oxygen reducing ability of a fuel cell electrode (c6) using the catalyst (c6)).

TABLE 1

| | Atomic Number Ratio | | BET Specific Surface Area | Oxygen Reduction Onset Potential/ | Oxygen Reduction Current Density @0.75 V | Oxygen Reduction Current Density @0.80 V |
|---|---|---|---|---|---|---|
| | M1 (Ti) | M2 (Fe) | (m²/g) | V vs RHE | (mA/cm²) | (mA/cm²) |
| Example 1 | 0.90 | 0.10 | 240.4 | 0.97 | 1.854 | 0.601 |
| Example 2 | 0.90 | 0.10 | 303.3 | 0.94 | 1.795 | 1.300 |
| Example 3 | 0.90 | 0.10 | 289.3 | 1.00 | 1.801 | 1.213 |
| Example 4 | 0.90 | 0.10 | 259.0 | 0.93 | 1.876 | 0.649 |
| Example 5 | 0.90 | 0.10 | 281.6 | 0.97 | 2.023 | 0.901 |
| Example 6 | 0.90 | 0.10 | 275.8 | 0.95 | 2.118 | 0.952 |
| Example 7 | 0.90 | 0.10 | 268.8 | 0.97 | 1.937 | 0.927 |
| Example 8 | 0.90 | 0.10 | 268.6 | 0.95 | 1.802 | 0.935 |
| Example 9 | 0.90 | 0.10 | 260.6 | 0.94 | 1.984 | 0.634 |
| Example 10 | 0.90 | 0.10 | 230.1 | 0.97 | 1.604 | 0.460 |

TABLE 2

| | Atomic Number Ratio | | BET Specific Surface Area | Oxygen Reduction Onset Potential/ | Oxygen Reduction Current Density @0.75 V | Oxygen Reduction Current Density @0.80 V |
|---|---|---|---|---|---|---|
| | M1 (Ti) | M2 (Fe) | (m²/g) | V vs RHE | (mA/cm²) | (mA/cm²) |
| Comp. Ex. 1 | 0.90 | 0.10 | 205.6 | 0.90 | 1.706 | 0.457 |
| Comp. Ex. 2 | 0.96 | 0.04 | 77.0 | 0.62 | 0.000 | 0.000 |
| Comp. Ex. 3 | 0.96 | 0.04 | 3.6 | 0.64 | 0.000 | 0.000 |
| Comp. Ex. 4 | 0.95 | 0.05 | 229.0 | 0.76 | 0.000 | 0.000 |
| Comp. Ex. 5 | 1 | | 9.4 | 0.47 | 0.000 | 0.000 |
| Comp. Ex. 6 | 1 | | 1.8 | 0.55 | 0.000 | 0.000 |

The invention claimed is:

1. A process for producing a fuel cell electrode catalyst comprising:
   a step (I) of obtaining a catalyst precursor, including a step (Ia) of mixing at least a metal compound (1), a nitrogen-containing organic compound (2), and a fluorine-containing compound (3), and
   a step (II) of heat-treating the catalyst precursor at a temperature of 500 to 1300° C. to obtain an electrode catalyst,
   the metal compound (1) comprises a metal compound (M1) containing an atom of a metal element M1 and a transition metal compound (M2) containing at least one transition metal element M2 selected from iron, nickel, chromium, cobalt and manganese, wherein the metal element M1 is titanium, wherein the transition metal element M2 comprises iron, wherein a metal element with the highest molar ratio of the different metal elements contained in the metal compound (1) is titanium, and wherein at least one of the compounds (1), (2) and (3) containing an oxygen atom, wherein the nitrogen-containing compound (2) has in a molecule thereof, at least one functional group selected from amino group, nitrile group, imide group, imine group, nitro group, amide group, azide group, aziridine group, azo group, isocyanate group, isothiocyanate group, oxyme group, diazo group and nitroso group, or has a ring selected from pyrrole ring, porphyrin ring, pyrrolidine ring, imidazole ring, triazole ring, pyridine ring, piperidine ring, pyrimidine ring, pyrazine ring and purine ring, and wherein the fluorine-containing compound (3) contains none of a boron atom, a phosphorus atom and a sulfur atom, and wherein the fluorine-containing compound (3) is at least one kind selected from the group consisting of fluorine atom-containing alcohols, fluorine atom-containing ethers, fluorine atom-containing amines, fluorine atom-containing carboxylic acids and derivatives thereof.

2. The process for producing a fuel cell electrode catalyst according to claim 1, wherein the fluorine-containing compound (3) satisfies the following (i) or (ii):
(i): being a solid or a liquid at 0.1 MPa at 150° C.;
(ii): having a decomposition temperature of 150° C. or higher and lower than 500° C. at 0.1 MPa.

3. The process for producing a fuel cell electrode catalyst according to claim 1, wherein in the step (1a), a solvent is further mixed.

4. The process for producing a fuel cell electrode catalyst according to claim 3, wherein the step (I) includes the step (Ia) and a step (1b) of removing the solvent.

5. The process for producing a fuel cell electrode catalyst according to claim 3, wherein in the step (Ia), a solution of the metal compound (1) is mixed with the nitrogen-containing organic compound (2).

6. The process for producing a fuel cell electrode catalyst according to claim 3, wherein in the step (Ia), a compound having a diketone structure is further mixed.

7. The process for producing a fuel cell electrode catalyst according to claim 1, wherein the transition metal element M2 further comprises at least one transition metal element selected from nickel, chromium, cobalt and manganese.

8. The process for producing a fuel cell electrode catalyst according to claim 1, wherein the metal compound (1) is at least one selected from the group consisting of metal phosphates, metal sulfates, metal nitrates, metal organic acid salts, metal acid halides, metal alkoxides, metal halides, metal perhalates, metal hypohalites and metal complexes.

9. The process for producing a fuel cell electrode catalyst according to claim 1, wherein the nitrogen-containing organic compound (2) has, in a molecule thereof, at least one functional group selected from the group consisting of amino group, nitrile group, imide group, imine group, nitro group, amide group, azide group, aziridine group, azo group, isocyanate group, isothiocyanate group, oxyme group, diazo group, nitroso group, pyrrole ring, porphyrin ring, imidazole ring, pyridine ring, pyrimidine ring and pyrazine ring.

10. The process for producing a fuel cell electrode catalyst according to claim 1, wherein the nitrogen-containing organic compound (2) has, in a molecule thereof, at least one group selected from the group consisting of hydroxyl group, carboxyl group, aldehyde group, acid halide group, sulfo group, phosphate group, ketone group, ether group and ester group.

11. The process for producing a fuel cell electrode catalyst according to claim 1, wherein in the step (II), the catalyst precursor is heat-treated in an atmosphere containing 0.01% by volume to 10% by volume of a hydrogen gas.

12. A fuel cell electrode catalyst obtained by the production process according to claim 1.

13. A fuel cell catalyst layer comprising the fuel cell electrode catalyst according to claim 12.

14. An electrode comprising the fuel cell catalyst layer according to claim 13 and a porous support layer.

15. A membrane electrode assembly comprising a cathode, an anode and an electrolyte membrane interposed between the cathode and the anode, wherein the cathode and/or the anode is the electrode according to claim 14.

16. A fuel cell comprising the membrane electrode assembly according to claim 15.

17. The fuel cell according to claim 16, which is a polymer electrolyte fuel cell.

18. An article equipped with a function selected from the group consisting of electricity generating function, light emitting function, heat generating function, sound generating function, movement function, display function and charging function, the article comprising the fuel cell according to claim 16.

19. A process for producing a fuel cell electrode catalyst comprising:
a step (I) of obtaining a catalyst precursor, including a step (Ia) of mixing at least a metal compound (1), a nitrogen-containing organic compound (2), and a fluorine-containing compound (3), and
a step (II) of heat-treating the catalyst precursor at a temperature of 500 to 1300° C. to obtain an electrode catalyst,
the metal compound (1) comprises a metal compound (M1) containing an atom of a metal element M1 and a transition metal compound (M2) containing at least one transition metal element M2 selected from iron, nickel, chromium, cobalt and manganese,
wherein the metal element M1 is titanium,
wherein the transition metal element M2 comprises iron,
wherein a metal element with the highest molar ratio of the different metal elements contained in the metal compound (1) is titanium, and
at least one of the compounds (1), (2) and (3) containing an oxygen atom,
the fluorine-containing compound (3) is selected from the group consisting of fluorine atom-containing alcohols, fluorine atom-containing ethers, fluorine atom-containing amines, fluorine atom-containing carboxylic acids and derivatives thereof, and
wherein in a ratio (C/A) of a total atomic number "C" of nitrogen of the nitrogen-containing organic compound (2) used in the step (Ia) to a total atomic number "A" of the metal element M1 of the metal compound (1) used in the step (Ia) is from 2.5 to 17,
wherein the nitrogen-containing compound (2) has in a molecule thereof, at least one functional group selected from amino group, nitrile group, imide group, imine group, nitro group, amide group, azide group, aziridine group, azo group, isocyanate group, isothiocyanate group, oxyme group, diazo group and nitroso group, or has a ring selected from pyrrole ring, porphyrin ring, pyrrolidine ring, imidazole ring, triazole ring, pyridine ring, piperidine ring, pyrimidine ring, pyrazine ring and purine ring, and wherein the fluorine-containing compound (3) contains none of a boron atom, a phosphorus atom and a sulfur atom, and wherein the fluorine-containing compound (3) is at least one kind selected from the group consisting of fluorine atom-containing alcohols, fluorine atom-containing ethers, fluorine atom-containing amines, fluorine atom-containing carboxylic acids and derivatives thereof.

20. The process for producing a fuel cell electrode catalyst according to claim 1, wherein a ratio of the metal compound (M2) in the metal compound (1) used in the step (Ia) converted to a metal atom ratio $\alpha$ of a total atomic number of the metal element M2 relative to a total atomic number of metal elements of the metal compound (1) is in the range of $0.01 \leq \alpha \leq 0.45$.

21. The process for producing a fuel cell electrode catalyst according to claim 19, wherein a ratio of the metal compound (M2) in the metal compound (1) used in the step (Ia) converted to a metal atom ratio $\alpha$ of a total atomic number of the metal element M2 relative to a total atomic number of metal elements of the metal compound (1) is in the range of $0.01 \leq \alpha \leq 0.45$.

* * * * *